United States Patent
Nishigaki et al.

(10) Patent No.: US 9,888,069 B2
(45) Date of Patent: Feb. 6, 2018

(54) PORTABLE ELECTRONIC DEVICE AND PROGRAM

(71) Applicant: NIKON CORPORATION, Tokyo (JP)

(72) Inventors: Koji Nishigaki, Tokyo (JP); Shigehiro Yoshinaga, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 502 days.

(21) Appl. No.: 14/546,059

(22) Filed: Nov. 18, 2014

(65) Prior Publication Data

US 2015/0156260 A1    Jun. 4, 2015

Related U.S. Application Data

(63) Continuation of application No. PCT/JP2013/064932, filed on May 29, 2013.

(30) Foreign Application Priority Data

May 31, 2012  (JP) ................. 2012-124973
May 31, 2012  (JP) ................. 2012-124974
May 31, 2012  (JP) ................. 2012-124975

(51) Int. Cl.
*H04L 29/08* (2006.01)
*G06F 15/173* (2006.01)
(Continued)

(52) U.S. Cl.
CPC .......... *H04L 67/1042* (2013.01); *H04L 67/04* (2013.01); *H04L 67/1046* (2013.01); *H04W 40/00* (2013.01); *H04W 76/023* (2013.01)

(58) Field of Classification Search
USPC ........ 709/223, 253, 239, 251, 224, 243, 225
See application file for complete search history.

(56) References Cited

U.S. PATENT DOCUMENTS 6,693,891 B1 * 2/2004 Sugita .............. H04J 3/0605
                                                    370/329
7,132,808 B1 * 11/2006 Thexton ........... H02P 7/298
                                                    318/246

(Continued)

FOREIGN PATENT DOCUMENTS

JP   2008-193407   8/2008
JP   2008-242990   10/2008

(Continued)

OTHER PUBLICATIONS

PCT Written Opinion of the International Searching Authority dated Jul. 2, 2013 in corresponding International Patent Application No. PCT/JP2013/064932.

(Continued)

*Primary Examiner* — Jude Jean Gilles

(57) ABSTRACT

A portable electronic device includes a topology control section that controls a topology of a P2P network. The topology control section controls, when the portable electronic device functions as a root node, acceptance or rejection of connection of another portable electronic device that functions as an non-associated node to each node under control of the portable electronic device, and controls, when the portable electronic device functions as a branch node or a leaf node, acceptance or rejection of connection of the other portable electronic device that functions as the non-associated node to the portable electronic device according to the control of a root node.

30 Claims, 31 Drawing Sheets

(51) Int. Cl.
*H04W 40/00* (2009.01)
*H04W 76/02* (2009.01)

(56) References Cited

U.S. PATENT DOCUMENTS

| | | | | |
|---|---|---|---|---|
| 7,451,359 | B1* | 11/2008 | Coekaerts | G06F 11/0709 709/223 |
| 2002/0049505 | A1* | 4/2002 | Heinemann | H02P 5/00 700/22 |
| 2002/0194371 | A1* | 12/2002 | Kadoi | H04L 12/42 709/239 |
| 2003/0161330 | A1* | 8/2003 | Umeda | H04L 45/02 370/400 |
| 2004/0034720 | A1* | 2/2004 | Fujita | H04L 29/06 709/253 |
| 2004/0054807 | A1* | 3/2004 | Harvey | H04L 12/56 709/243 |
| 2008/0159289 | A1 | 7/2008 | Narayanan et al. | |
| 2008/0235746 | A1* | 9/2008 | Peters | H04N 7/17318 725/111 |
| 2009/0019156 | A1* | 1/2009 | Mo | H04L 63/102 709/225 |
| 2009/0089410 | A1* | 4/2009 | Vicente | G06F 9/45533 709/223 |
| 2010/0238855 | A1 | 9/2010 | Yoshida et al. | |
| 2011/0004681 | A1* | 1/2011 | Das | H04L 41/12 709/224 |
| 2011/0305167 | A1* | 12/2011 | Koide | H04L 41/12 370/255 |
| 2011/0305168 | A1* | 12/2011 | Koide | H04L 41/12 370/255 |
| 2012/0173620 | A1* | 7/2012 | Holostov | H04L 67/1048 709/204 |
| 2015/0350737 | A1* | 12/2015 | Anderson | H04N 21/47205 348/564 |

FOREIGN PATENT DOCUMENTS

| | | |
|---|---|---|
| JP | 2010-124294 | 6/2010 |
| WO | WO 2010/010708 A1 | 1/2010 |

OTHER PUBLICATIONS

Kentaro Yanagihara et al., "An Energy Efficient Method for Multi-hop Sensor Networks with Asymmetric Path Routing", IEICE Technical Report IN2007-220, Feb. 28, 2008, 17 pp.

Takashi Watanabe et al., "Infra-less Infrastructure: from the Present to the Future: Ad hoc Networks and Sensor Networks View", IEICE Technical Report NS2007-46, Jul. 12, 2007, 20 pp.

International Search Report dated Jul. 2, 2013, in corresponding International Patent Application No. PCT/JP2013/064932.

Japanese Office action dated Mar. 28, 2017 in corresponding Japanese Patent Application No. 2014-518703.

* cited by examiner

POSITION OF ■ IS SHOWN AS EXAMPLE

POSITION OF ■ IS SHOWN AS EXAMPLE

FIG. 3A

| CONNECTION DETERMINATION CONDITION | PROCESS BASED ON DETERMINATION RESULT |
|---|---|
| RESIDUAL BATTERY CAPACITY (CHECK OF SMALL RESIDUAL BATTERY CAPACITY) | HOST RESIDUAL BATTERY CAPACITY < THRESHOLD VALUE ≦ RESIDUAL BATTERY CAPACITY OF THE OTHER NODE : LEAF NODE (FIRST LEAF NODE) OTHER CASES: FOLLOW RESIDUAL BATTERY CAPACITY (DIRECT CHECK) *THRESHOLD VALUE IS DEFINED AS SMALL RESIDUAL BATTERY CAPACITY LEVEL. *WHEN HOST RESIDUAL BATTERY CAPACITY < THRESHOLD VALUE, AND RESIDUAL BATTERY CAPACITY OF THE OTHER NODE < THRESHOLD VALUE, PROCESS MAY BE TERMINATED (NON-CONNECTION). |
| RESIDUAL BATTERY CAPACITY (DIRECT CHECK) | HOST RESIDUAL BATTERY CAPACITY>THE OTHER RESIDUAL BATTERY CAPACITY : ROOT NODE HOST RESIDUAL BATTERY CAPACITY<THE OTHER RESIDUAL BATTERY CAPACITY : LEAF NODE (FIRST LEAF NODE) |

FIG. 3B

| CONNECTION DETERMINATION CONDITION | PRIORITY | PROCESS BASED ON DETERMINATION RESULT |
|---|---|---|
| CONNECTION STATUS OF THE OTHER PARTY | PRIORITY P1 | FULL: PROCESS IS TERMINATED (NO BREAKING)<br>NON-FULL: FOLLOW THE NEXT PRIORITY CONDITION<br>* "FULL" MEANS THAT CONNECTION ACCEPTED NODES ARE ALREADY CONNECTED |
| NUMBER OF NODES | PRIORITY P2 | NUMBER OF NODES OF HOST NW > NUMBER OF NODES OF THE OTHER NW:<br>  PROCESS IS TERMINATED (NO BREAKING)<br>NUMBER OF NODES OF HOST NW < NUMBER OF NODES OF THE OTHER NW: BREAK<br>NUMBER OF NODES OF HOST NW = NUMBER OF NODES OF THE OTHER NW:<br>  FOLLOW THE NEXT PRIORITY CONDITION |
| NUMBER OF RANKS | PRIORITY P3 | NUMBER OF RANKS OF HOST NW < NUMBER OF RANKS OF THE OTHER NW:<br>  PROCESS IS TERMINATED (NO BREAKING)<br>NUMBER OF RANKS OF HOST NW > NUMBER OF RANKS OF THE OTHER NW: BREAK<br>NUMBER OF RANKS OF HOST NW = NUMBER OF RANKS OF THE OTHER NW:<br>  FOLLOW THE NEXT PRIORITY CONDITION |
| CLUSTER (NW) ID | PRIORITY P4 | HOST CLUSTER ID > THE OTHER CLUSTER ID: PROCESS IS TERMINATED (NO BREAKING)<br>HOST CLUSTER ID < THE OTHER CLUSTER ID: BREAK<br>*HOST CLUSTER ID IS UNIQUE VALUE, WHICH IS NOT OVERLAPPED |

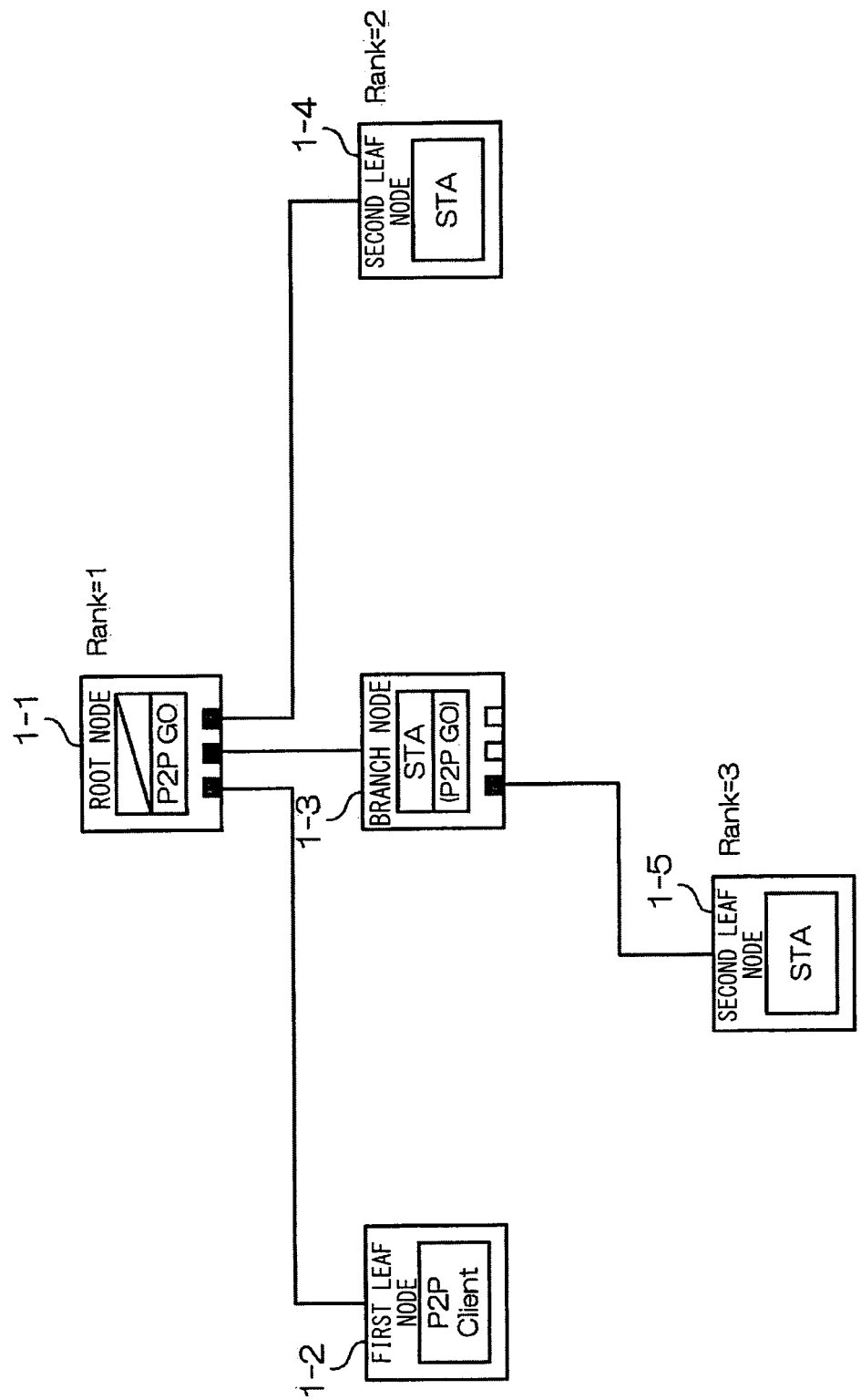

PORTABLE ELECTRONIC DEVICE AND PROGRAM

CROSS-REFERENCE TO RELATED APPLICATION

Priority is claimed on Japanese Patent Application No. 2012-124973, filed on May 31, 2012, Japanese Patent Application No. 2012-124974, filed on May 31, 2012 and Japanese Patent Application No. 2012-124975, filed on May 31, 2012. This is a continuation application of International Patent Application PCT/JP2013/064932 filed on May 29, 2013. The contents of the above applications are incorporated herein by reference.

BACKGROUND

Technical Field

The present invention relates to a portable electronic device and a program.

In recent years, a technique in which plural portable electronic devices are hierarchically connected to each other in a peer-to-peer (hereinafter, referred to P2P) form in a wireless manner to dynamically form a network of a tree structure and data (music, image, video or the like) is transmitted and received between the plural portable electronic devices has been proposed (for example, see Japanese Unexamined Patent Application, First Publication No. 2010-124294, and Japanese Unexamined Patent Application, First Publication No. 2008-242990).

SUMMARY

However, in the related art technique as disclosed in Japanese Unexamined Patent Application, First Publication No. 2010-124294, generally, a P2P network is configured or reconfigured according to the receiving quality or the like. Thus, the hierarchy of the P2P network after configuration or reconfiguration becomes extremely deep in some cases. As a result, the number of hops (total number of nodes to be passed and an end-point node) in the P2P network becomes large, and communication performance may deteriorate. In the technique disclosed in Japanese Unexamined Patent Application, First Publication No. 2010-124294, the reconfiguration when P2P networks encounter each other is not considered, but when one P2P network is simply and additionally connected to another P2P network, the hierarchy of the P2P networks after reconfiguration becomes extremely deep.

An object of the invention is to provide a technique capable of suppressing deterioration of communication performance and efficiently configuring a P2P network.

In the related art technique as disclosed in Japanese Unexamined Patent Application, First Publication No. 2008-242990, when there is a connection restriction in which a grandchild node cannot be connected in the initial connection protocol used when forming (connecting) a P2P network, there is a problem in that the number of nodes that form the P2P network cannot be maximized in certain conditions (for example, when a maximum number of ranks of a tree structure and a maximum number of connections of child nodes (portable electronic devices) connected directly thereto are regulated).

Another object of the invention is to provide a technique capable of maximizing the number of nodes that form a P2P network under a certain condition.

According to an aspect of the invention, a portable electronic device is provided that transitions to each state of a root node, a branch node or a leaf node in a P2P network of a cluster structure, or an non-associated node that does not belong to the P2P network, in order to perform a function of the transitioned node according to the status of wireless connection with another portable electronic device, the portable electronic device including a topology control section configured to control topology of the P2P network, wherein, when the portable electronic device is functioning as the root node, the topology control section controls acceptance or rejection of the another portable electronic device, which is functioning as the non-associated node, for connecting with each node under control of the portable electronic device, and wherein, when the portable electronic device is functioning as the branch node or the leaf node, the topology control section controls acceptance or rejection of the another portable electronic device, which is functioning as the non-associated node, for connecting with the portable electronic device in accordance with a control of a root node.

According to another aspect of the invention, a portable electronic device is provided that transitions to each state of a root node, a branch node or a leaf node in a P2P network of a cluster structure, or an non-associated node that does not belong to the P2P network, in order to perform a function of the transitioned node according to the status of wireless connection with another portable electronic device, the portable electronic device including: a transition control section configured to control the transition; a search section configured to search the another portable electronic device that is connectable; and a connection control section configured to control connection with the another portable electronic device found by the search section, wherein, when the portable electronic device is functioning as the non-associated node, the connection control section performs a control for connecting the portable electronic device with the another portable electronic device when the another portable electronic device functioning as a root node or a branch node in a P2P network is found, and wherein, when the portable electronic device is functioning as the root node in a certain P2P network, the connection control section performs a control for terminating connection of the another portable electronic device in the P2P network according to a predetermined connection determination condition when the another portable electronic device functioning as a root node in another P2P network is found.

According to still another aspect of the invention, a portable electronic device is provided that transitions to each state of a root node, a branch node or a leaf node in a P2P network of a cluster structure, or an non-associated node that does not belong to the P2P network, in order to perform a function of the transitioned node, the portable electronic device including: a transition control section configured to control the transition; a search section configured to search the another portable electronic device that is connectable; and a connection control section configured to control connection with the another portable electronic device found by the search section, wherein, when the portable electronic device is functioning as the non-associated node and when the another portable electronic device functioning as an non-associated node is found, the connection control section performs a control for connecting the portable electronic device with the another electronic device as a first connection control, performs a control for terminating the connection with the another portable electronic device connected by the first connection control as a second connection control, and performs a control for re-connecting the portable electronic device with the another portable electronic device in which the connection is terminated by the second connection control as a third connection control.

According to still another aspect of the invention, a program is provided that causes a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device to execute a procedure including the steps of: controlling the transition; and controlling a topology of the P2P network, wherein the step of controlling the topology includes the steps of controlling, when the portable electronic device is functioning as the root node, acceptance or rejection of the another portable electronic device, which is functioning as the non-associated node, for connecting with each node under control of the portable electronic device, and controlling, when the portable electronic device is functioning as the branch node or the leaf node, acceptance or rejection of the another portable electronic device, which is functioning as the non-associated node, for connecting with the portable electronic device in accordance with a control of a root node.

According to still another aspect of the invention, a program is provided that causes a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device to execute a procedure including the steps of: controlling the transition; searching the another portable electronic device that is connectable; and controlling connection with the another portable electronic device found by the searching, wherein the step of controlling the connection includes the steps of performing, when the portable electronic device is functioning as the non-associated node, a control for connecting the portable electronic device with the another portable electronic device when the another portable electronic device functioning as a root node or a branch node in another P2P network is found, and performing, when the portable electronic device is functioning as the root node in a certain P2P network, a control for terminating connection of the another portable electronic device in the P2P network according to a predetermined connection determination condition when the another portable electronic device functioning as the root node in another P2P network is found.

According to still another aspect of the invention, a program is provided that causes a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device to execute a procedure including the steps of: controlling the transition; searching the another portable electronic device that is connectable; and controlling connection with the another portable electronic device found by the search section, wherein the step of controlling the connection includes the steps of, when the portable electronic device is functioning as the non-associated node and when the another portable electronic device functioning as an non-associated node is found, performing a control for connecting the portable electronic device with the another electronic device as a first connection control, performing a control for terminating the connection with the another portable electronic device connected by the first connection control as a second connection control, and performing a control for re-connecting the portable electronic device with the another portable electronic device in which the connection is terminated by the second connection control as a third connection control.

According to the aspect of the invention, it is possible to suppress deterioration of communication performance and to efficiently configure a P2P network.

Further, according to another aspect of the invention, it is possible to maximize the number of nodes that form a P2P network under a certain condition.

BRIEF DESCRIPTION OF THE DRAWINGS

FIG. 3A is a conceptual diagram illustrating a connection condition example of a portable electronic device according to the present embodiment.

FIG. 3B is a conceptual diagram illustrating a connection condition example of a portable electronic device according to the present embodiment.

FIG. 8E is a conceptual diagram illustrating a connection example when another portable electronic device (non-associated node) comes near in the state shown in FIG. 8D, according to the present embodiment.

DESCRIPTION OF THE EMBODIMENTS

Hereinafter, embodiments of the invention will be described with reference to the accompanying drawings.

Figure 1:
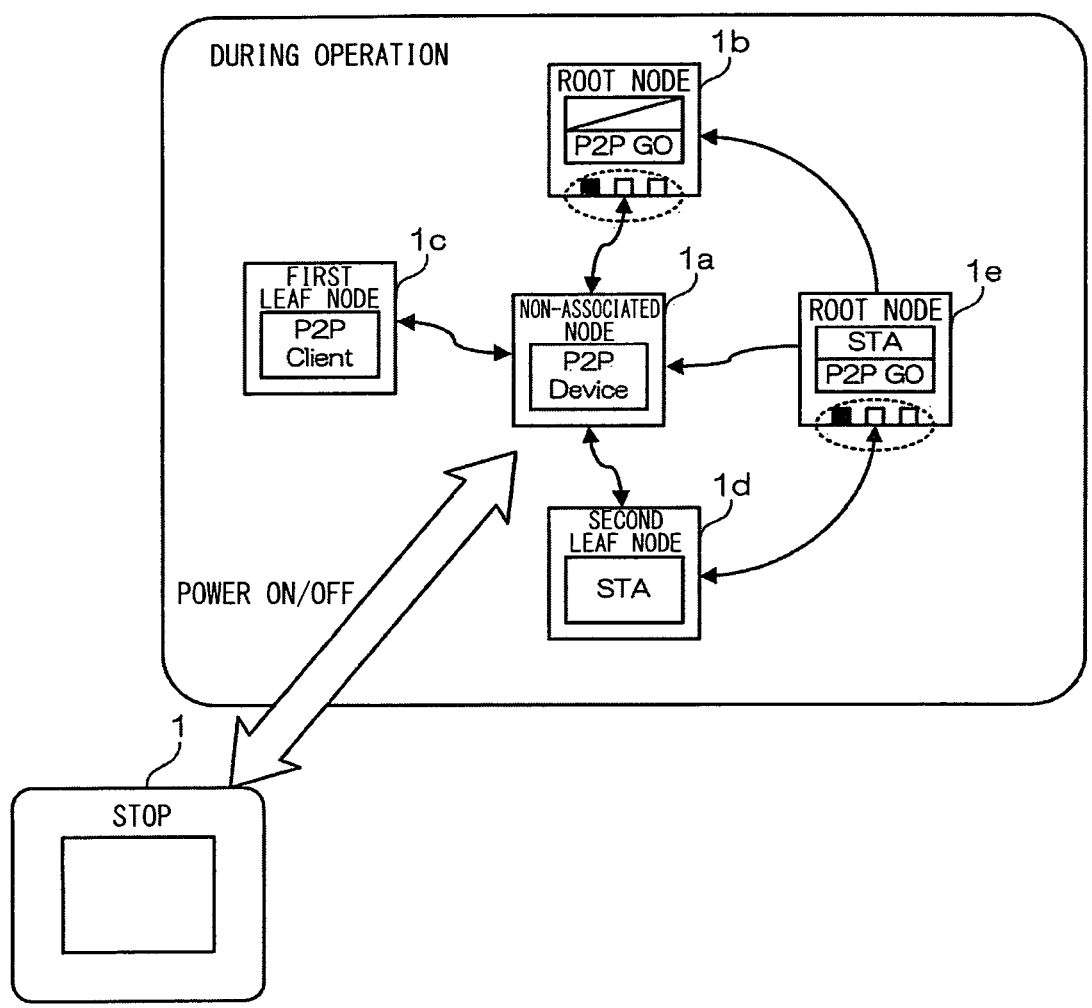
FIG. 1 is a conceptual diagram illustrating state transition of a portable electronic device according to the present embodiment.

FIG. 1 is a conceptual diagram illustrating state transition of a portable electronic device according to the present embodiment. A portable electronic device 1 is operated as an non-associated node 1a when the portable electronic device 1 enters an operating state where the power is turned on from a stop state where the power is turned off. Then, if the portable electronic device 1 approaches another portable electronic device 1 at a predetermined distance, the portable electronic device 1 transitions to any one of a root node 1b, a first leaf node 1c, and a second leaf node 1d according to a predetermined connection determination condition (to be described later). Further, the second leaf node 1d transitions to a branch node 1e using a concurrent operation (concurrent mode) to be described later.

When connection to a P2P network is terminated, each of the root node 1b, the first leaf node 1c, the second leaf node 1d, and the branch node 1e transition to the non-associated node 1a, and then, transition to the root node 1b, the second leaf node 1d, or the branch node 1e during the rebuilding of the P2P network.

The non-associated node 1a, the root node 1b, the first leaf node 1c, the second leaf node 1d, and the branch node 1e will be described. The non-associated node 1a refers to a node that is not connected to another portable electronic device 1. The root node 1b refers to a parent node of the highest layer. The root node 1b controls connection relating to all nodes such as a child node connected the root node 1b, and a grandchild node connected to the child node. One root node 1b is present in one P2P network.

The first leaf node 1c refers to a node that does not accept connection to another portable electronic device 1. That is, the first leaf node 1c refers to a node where a child node connection is not scheduled, and is connected to the root node 1b by a first protocol (Wi-Fi P2P). When communication traffic is decreased, the first leaf node 1c is re-connected to the root node 1b as the second leaf node 1d by a second protocol (IEEE802.11).

The second leaf node 1d refers to a node that does not accept connection to another portable electronic device 1. That is, the second leaf node 1d refers to a node where a child node connection is not scheduled. The second leaf node 1d is connected to a parent node by the second protocol (IEEE802.11). The second leaf node 1d connected to the parent node by the second protocol can use a concurrent operation of simultaneously operating the first protocol and the second protocol. Thus, the second leaf node 1d transitions to a node capable of being connected to another portable electronic device 1. That is, the second leaf node 1d transitions to the branch node 1e where a child node connection is scheduled. That is, the second leaf node 1d does not accept the connection to another portable electronic device 1, but can use the concurrent operation and can transition to the branch node 1e.

On the other hand, the first leaf node 1c connected to the parent node by the first protocol cannot use the concurrent operation due to restrictions of the first protocol. Thus, the first leaf node 1c cannot transition to the branch node 1e.

In this specification, the branch node 1e refers to a node disposed between a parent node and a child node, or a node that is not connected to a child node but includes a parent node and is connectable to the child node.

In the present embodiment, if the portable electronic device 1 encounters another portable electronic device 1, the portable electronic device 1 and another portable electronic device 1 mutually function as any node of the above mentioned non-associated node 1a, the root node 1b, the first leaf node 1c, the second leaf node 1d, and the branch node 1e. Thus, the portable electronic device 1 and another portable electronic device 1 build a P2P network of a tree structure formed of plural ranks. In the present embodiment, by limiting the hierarchy of the P2P network to three ranks of Rank=1 to 3, the P2P network is configured while suppressing deterioration of communication performance.

Here, the number of the ranks depends on the communication capability or the like of the portable electronic device 1. Thus, the number is not limited to three ranks, and may be designed according to the communication capability or the like of the portable electronic device 1.

In the present embodiment, each node may accept connection up to a maximum of three child nodes. However, since this depends on the communication performance or the like of the portable electronic device 1, the number is not limited to three, and may be designed according to the communication capability or the like of the portable electronic device 1.

In the present embodiment, by connecting the non-associated node 1a in the order from a high-ranking node as many as circumstances allow, the P2P network can be configured without an increase of the depth of the hierarchy.

FIGS. 2A to 2E are conceptual diagrams illustrating a connection acceptance or rejection state of the portable electronic device 1 according to the present embodiment. In FIGS. 2A to 2E, each block represents the portable electronic device 1, that is, a node. Further, a small square (white square □ or black square ■) shown in each block represents a connection acceptance or rejection state of another portable electronic device 1 with respect to the host node. The portable electronic device 1 may accept connection up to a maximum of three other portable electronic devices 1 in a wireless manner according to a predetermined protocol.

Here, the connection acceptance or rejection with respect to another portable electronic device 1 is controlled according to which node the portable electronic device 1 is or according to an instruction of the higher ranking root node 1b.

Figure 2A:
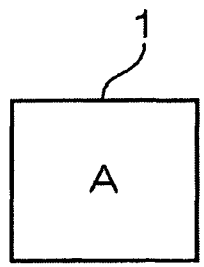
FIG. 2A is a conceptual diagram illustrating a connection acceptance or rejection state of a portable electronic device according to the present embodiment.
Figure 2B:
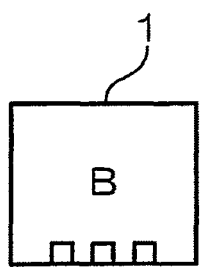
FIG. 2B is a conceptual diagram illustrating a connection acceptance or rejection state of a portable electronic device according to the present embodiment.

As shown in FIG. 2A, a node A where there is no square (white square □) represents a node that is not connected to another portable electronic device 1 or a connection-disabled node (first leaf node 1c). As shown in FIG. 2B, a node B indicated by three squares (white squares □) represents a node ("connection-accepting node/empty state") where connection of three (total number of white squares □) child nodes is scheduled. In other words, the node B is in a state where no child node is connected thereto. The node B can accept the connection of the child node until the number of the connected child nodes reaches a predetermined number (three). That is, the node B can accept the connection of three subsequent child nodes. For example, when the child node is actually connected, or when virtual (pseudo) connection thereof is set, the node B transitions to a node C, D, or E to be described below according to the number of connections.

Figure 2C:
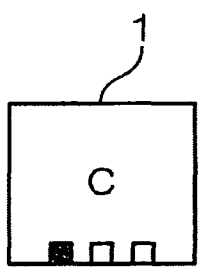
FIG. 2C is a conceptual diagram illustrating a connection acceptance or rejection state of a portable electronic device according to the present embodiment.

As shown in FIG. 2C, the node C indicated by one black square (■) and two white squares (□) among three squares (white squares □) represents a node where one (the number of black squares ■) child node is already connected thereto and connection of two (the number of white squares □) child nodes ("connect-accepting node/empty state") is scheduled. That is, the node C represents a state where one child node is actually or virtually connected thereto. The node C can accept the connection of the child node until the number of the connected child nodes reaches a predetermined number (three). That is, the node C can accept the connection of two subsequent child nodes.

Figure 2D:
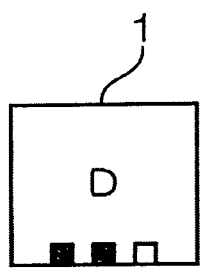
FIG. 2D is a conceptual diagram illustrating a connection acceptance or rejection state of a portable electronic device according to the present embodiment.
Figure 2E:
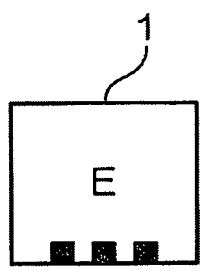
FIG. 2E is a conceptual diagram illustrating a connection acceptance or rejection state of a portable electronic device according to the present embodiment.

For example, when a new child node is actually connected thereto, or when a new connection thereof is virtually set, the node C transitions to the node D shown in FIG. 2D, or the node E shown in FIG. 2E, according to the number of connections. Further, when the child node is actually lost, or when the virtual connection setting is terminated, the node C transitions to the node B shown in FIG. 2B. In FIG. 1, for ease of description, it is assumed that the root node 1b, the branch node 1e, and the second node 1d correspond to the node C. However, this is only an example, and thus, the root node 1b, the branch node 1e, and the second node 1d may correspond to any one of the nodes B, C, D, and E.

As shown in FIG. 2D, the node D indicated by two black squares (■) and one white square (□) among three squares (white squares □) represents a node ("connection-accepting node/empty state") where two (the number of black squares ■) are already connected and connection of one (the number of white squares □) child node is scheduled. That is, the node D is in a state where two child nodes are actually or virtually connected. The node D can accept the connection of the child node until the number of the connected child nodes reaches a predetermined number (three). That is, the node D can accept the connection of one subsequent child node.

For example, when a new child node is actually connected the node D, or when a new connection thereof is virtually set, the node D transitions to the node E shown in FIG. 2E. Further, when the child node is actually lost, or when the virtual connection setting is terminated, the node D transitions to the node C or B according to the number of connections.

As shown in FIG. 2E, the node E indicated by all black squares (■) among three squares (white squares □) represents a node ("connection-disabled node/full state") where three nodes are actually or virtually connected the node E.

Since the number of the connected child nodes reaches a predetermined number, the node E cannot accept a new connection of the child node. When the child node is actually lost, or when the virtual connection setting is terminated, the node E transitions to the node D, C, or B according to the number of connections.

FIGS. 3A and 3B are conceptual diagrams illustrating connection condition examples of the portable electronic device 1 according to the present embodiment. FIG. 3A shows a connection condition (connection determination condition) when non-associated nodes encounter each other. As the connection condition, "residual battery capacity (check of small residual battery capacity)" and "residual battery capacity (direct check)" are prepared. When non-associated nodes encounter each other, each non-associated node compares the connection determination condition of the host node with that of the other node, and determines whether to transition to a root node or a leaf node.

In the "residual battery capacity (check of small residual battery capacity)", when the residual battery capacity of the host node (host residual capacity) is smaller than a threshold value and the residual battery capacity of the other node (the other residual battery capacity) is the threshold value or greater, the host node transitions to the leaf node (first leaf node) (while the other node transitions to the root node). In other cases, the host node follows the "battery residual capacity (direct check)". The threshold value is defined as a small residual battery capacity level. Further, when the residual battery capacity (host residual capacity) of the host node is smaller than the threshold value and the residual battery capacity of the other node (the other residual battery capacity) is also smaller than the threshold value, the process may be terminated (without connection).

In the "residual battery capacity (direct check)", when the residual battery capacity of the host node (host residual capacity) is greater than the residual battery capacity of the other node (the other residual battery capacity), the host node transitions to the root node, and when the residual battery capacity of the host node (host residual capacity) is smaller than the residual battery capacity of the other node (the other residual battery capacity), the host node transitions to the leaf node (first leaf node).

In the above-described embodiment, first, connection determination based on the "residual battery capacity (check of small residual battery capacity)" is performed, and then, connection determination based on the "residual battery capacity (direct check)" is performed. However, the invention is not limited thereto, and the connection determination based on the "residual battery capacity (check of small residual battery capacity)" may be omitted, and only the connection determination based on the "residual battery capacity (direct check)" may be performed.

FIG. 3B shows a connection condition (connection determination condition) when P2P networks encounter each other. As the connection condition, "connection status of the other network (full or not full)", "number of nodes", "number of ranks", and "cluster (NW) ID" are prepared. When the P2P networks encounter each other, the root node of each P2P network compares the connection determination condition of the host network (host NW) with that of the other network (the other NW), and determines whether to break the P2P network.

In the "connection status of the other network" (priority P1), if the P2P network of the other party is in the full (connection-disabled) state, the P2P network is not broken, and the process is terminated. On the other hand, if the P2P network of the other party is not in the full state, the process follows the next priority condition. Here, "full" means that all child nodes of which connection is accepted are already connected.

In the "number of nodes" (priority P2) that is the next priority condition, if the number of nodes of the P2P network (host NW) of the host device (portable electronic device 1) is greater than the number of nodes of the P2P network (the other party NW) of the other party, the host P2P network is not broken, and the process is terminated. On the other hand, if the number of nodes of the P2P network (host NW) of the host device is smaller than the number of nodes of the P2P network (the other NW) of the other party, the host P2P network is broken (all nodes become non-associated nodes). Further, if the number of nodes of the P2P networks (host NW) of the host device and the number of nodes of the P2P networks (the other party NW) of the other party are the same, the process follows the next priority condition.

In the "number of ranks" (priority P3) that is the next priority condition, if the number of ranks of the P2P network (host NW) of the host device is smaller than the number of ranks of the P2P network (the other party NW) of the other party, the host P2P network is not broken, and the process is terminated. On the other hand, if the number of ranks of the P2P network (host NW) of the host device is greater than the number of ranks of the network of the other party (the other party NW), the P2P network of the host device is broken (all nodes become non-associated nodes). Further, if the number of ranks of the P2P network (host NW) of the host device and the number of ranks of the P2P network (the other party NW) are the same, the process follows the next priority condition.

In the "cluster (NW) ID" (priority P4) that is the next priority condition, if a cluster ID (host cluster ID) of the host P2P network is greater than a cluster ID (the other party cluster ID) of the P2P network of the other party, the host P2P network is not broken, and the process is terminated. On the other hand, if the cluster ID (host cluster ID) of the host P2P network is smaller than the cluster ID (the other party cluster ID) of the P2P network of the other party, the host P2P network is broken (all nodes become non-associated nodes). The cluster ID (host cluster ID) of the host P2P network is a unique value in the P2P network of each device, and thus does not overlap the cluster ID of the other P2P network.

In the present embodiment, the order (priority) of the connection determination conditions is "connection status of the other party"→"number of nodes"→"number of ranks"→"cluster (NW) ID" (P1<P2<P3<P4). However, the order (priority) of the connection determination conditions is not limited thereto. Further, the number of the connection determination condition may be increased or decreased.

Figure 4:
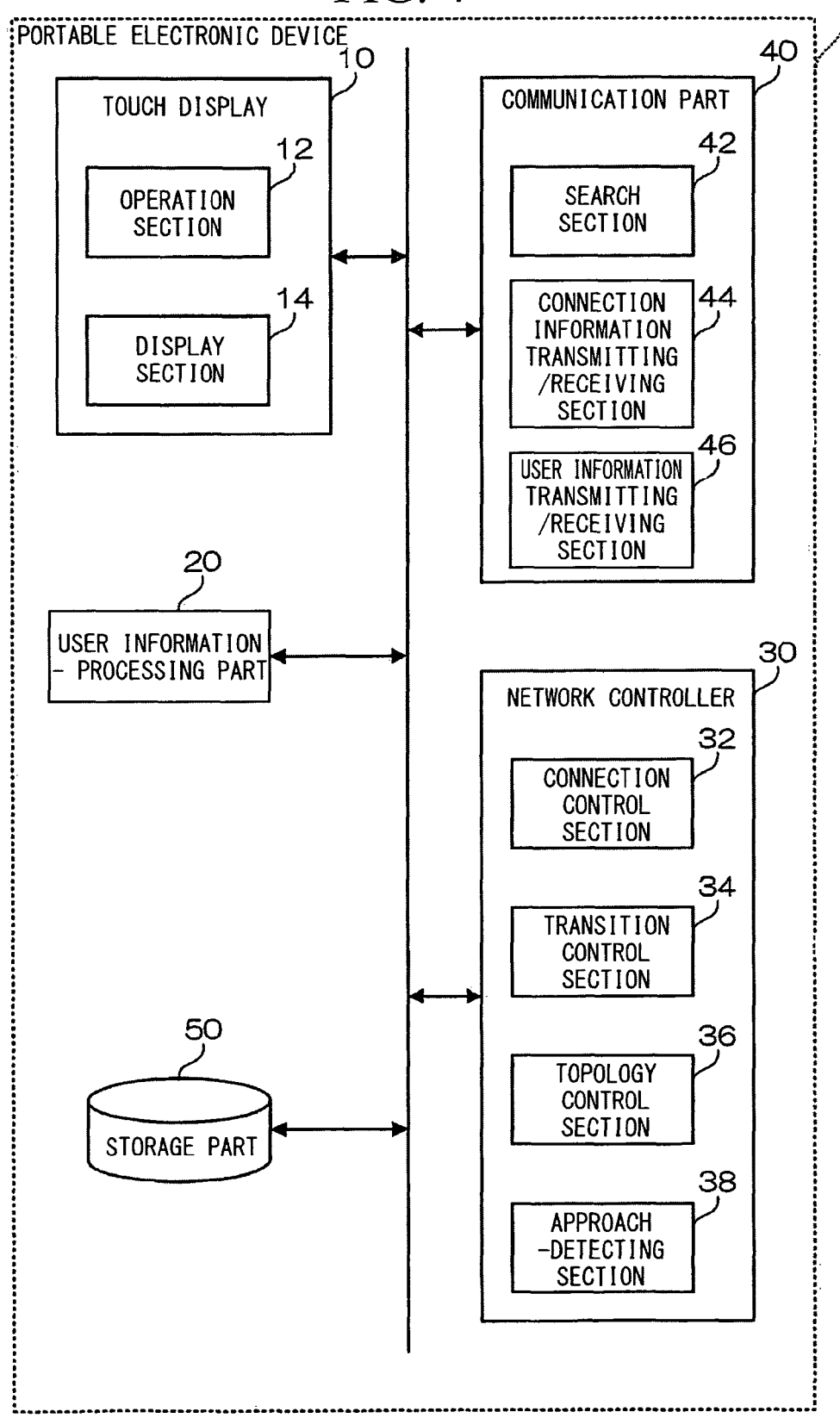
FIG. 4 is a block diagram illustrating a configuration of a portable electronic device according to the present embodiment.

FIG. 4 is a block diagram illustrating a configuration of the portable electronic device 1 according to the present embodiment. In FIG. 4, the portable electronic device 1 includes a touch display 10, a user information-processing part 20, a network controller 30, a communication part 40, and a storage part 50.

The touch display 10 includes an operating section 12, and a display section 14. The operating section 12 is provided to be superposed on the display section 14, and receives an input of a touch operation from a user.

The display section 14 includes a liquid crystal display, an organic EL display, or the like. The display section 14 displays an icon, various pieces of data, graphics or the like associated with a touch operation of the operating section 12.

The user information-processing part 20 processes user information (music, image, moving image or the like) by an application (program) that can be provided by the portable electronic device 1.

The network controller 30 includes a connection control section 32, a transition control section 34, a topology control section 36, and an approach-detecting section 38.

The connection control section 32 controls connection to another portable electronic device 1 found by a search section 42 to be described later. More specifically, when the portable electronic device 1 functions as the non-associated node 1a, and when another portable electronic device 1 that functions as the root node 1b or the branch node 1e in the P2P network is found, the connection control section 32 controls connection to the other portable electronic device 1.

Further, when the portable electronic device 1 functions as the root node 1a in a certain P2P network, and when another portable electronic device 1 that functions as the root node 1a in another P2P network is found, the connection control section 32 performs a control for terminating connection of the other portable electronic device 1 in the P2P network according to a predetermined connection determination condition as shown in FIG. 3B. Further, when the portable electronic device 1 functions as the root node 1b, the connection control section 32 controls wired connection to the root node 1b in the other P2P network by wired connection.

Further, when the portable electronic device 1 functions as the non-associated node 1a, and when another portable electronic device 1 that functions as the non-associated node 1a is found, the connection control section 32 performs a control for connection to the other electronic device 1 as a first connection control, performs a control for terminating the connection to the other portable electronic device 1 connected by the first connection control as a second connection control, and performs a control for re-connection to the other portable electronic device 1 in which the connection was terminated by the second connection control as a third connection control.

The connection control section 32 executes the first connection control, and then, executes the second connection control and the third connection control based on communication traffic with respect to the connected other portable electronic device 1. However, the connection control section 32 may execute the second connection control and the third connection control immediately after the first connection control is executed.

Further, when the portable electronic device 1 functions as the first leaf node 1c after the first connection control is executed, the connection control section 32 may execute the second connection control and the third connection control when connection of a child node directly under the host device is necessary.

The connection control section 32 executes the first connection control according to the first protocol (Wi-Fi P2P), and executes the third connection control according to the second protocol (IEEE802.11).

The transition control section 34 controls which one of the operating states of the non-associated node 1a, the root node 1b, the first leaf node 1c, the second leaf node 1d, and the branch node 1e the portable electronic device 1 transitions to. More specifically, after the first connection control is executed by the connection control section 32, the transition control section 34 transitions the host device from the non-associated node 1a to the root node 1b or the first leaf node 1c. Further, when the host device functions as the root node 1b after the first connection control is executed, the transition control section 34 maintains the state of the root node 1b after the second connection control is executed by the connection control section 32.

Further, when the host device functions as the first leaf node 1c after the first connection control is executed, the transition control section 34 transitions the host device from the first leaf node 1c to the non-associated node 1a after the second connection control is executed by the connection control section 32. Further, when the host device functions as the root node 1b after the second connection control is executed, the transition control section 34 maintains the state of the root node 1b after the third connection control is executed by the connection control section 32. In addition, when the host device functions as the non-associated node 1a after the second connection control is executed, the transition control section 34 transitions the host device to the second leaf node 1d from the non-associated node 1a after the third connection control is executed by the connection control section 32.

The topology control section 36 controls a topology of the P2P network. More specifically, when the host device functions as the root node 1b, the topology control section 36 controls acceptance or rejection of connection of another portable electronic device 1 that functions as the non-associated node 1a to each node under control of the host device. When the host device functions as the branch node 1e or the second leaf node 1d, the topology control section 36 controls acceptance or rejection of connection of another portable electronic device 1 that functions as the non-associated node 1a to the host device according to the control of the root node 1b.

In addition, when the host device functions as the root node 1b, the topology control section 36 performs a control for accepting connection of another portable electronic device 1 that functions as the non-associated node 1a to the host device, and performs a control for rejecting connection of another portable electronic device 1 that functions as the non-associated node 1a to each node under control of the host device, before the number of the child nodes directly under the host device reaches a predetermined number.

Furthermore, when the host device functions as the root node 1b, the topology control section 36 performs a control for rejecting connection of another portable electronic device 1 that functions as the non-associated node 1a to the host device, and performs a control for accepting connection of another portable electronic device 1 that functions as the non-associated node 1a to each node under control of the host device, after the number of the child nodes directly under control of the host device reaches the predetermined number.

Further, when another portable electronic device 1 that functions as the non-associated node 1a is connected to function as the branch node 1e, the topology control section 36 is configured not to re-build the P2P network (topology) when another portable electronic device 1 that functions as the second leaf node 1d or the branch node 1e of the same rank as that of the host device is separated from the P2P network.

In addition, when the host device functions as the root node 1b, the topology control section 36 performs a control for accepting connection of another portable electronic device 1 that functions as the non-associated node 1a to the host device that functions as the root node 1b or to a certain one electronic device 1 that functions as the branch node 1e or the second leaf node 1d under control of the host device.

When the host device functions as the non-associated node 1a, the approach-detecting section 38 searches for the root node 1b or the branch node 1e that is connectable. As a result of the search, if no node is found, the approach-detecting section 38 searches for the non-associated node 1a that is connectable. Further, when the host device functions as the branch node 1e or the second leaf node 1d, the approach-detecting section 38 detects approach of another portable electronic device 1 (for example, another portable electronic device 1 that functions as the non-associated node 1a). Further, the approach-detecting section 38 may detect approach of another portable electronic device 1 when the host device functions as the root node 1b.

When the host device functions as the branch node 1e or the second leaf node 1d, the approach-detecting section 38 may detect approach of another portable electronic device 1 according to the control of the root node 1b. In other words, when the host device functions as the root node 1b, a control may be performed so that the approach-detecting section 38 regularly (periodically) detects approach of another portable electronic device 1 to the branch node 1e or the second leaf node 1d, for example.

The communication part 40 includes a search section 42, a connection information transmitting/receiving section 44, and a user information transmitting/receiving section 46.

The search section 42 searches for another connectable portable electronic device 1 that is present in a predetermined communication range. Further, when the host device functions as the second leaf node 1d where connection of another portable electronic device 1 that functions as the non-associated node 1a thereto is accepted, the search section 42 searches for another portable electronic device 1 at a low frequency, compared with a case where the host device functions as the root node 1b.

The connection information transmitting/receiving section 44 transmits/receives connection information (information relating to residual battery capacity, information relating to the number of connection nodes, information relating to the number of ranks, information relating to cluster ID, or the like) to/from another portable electronic device 1.

The user information transmitting/receiving section 46 transmits/receives user information (music, image, moving image or the like) to/from another portable electronic device.

Figure 5:
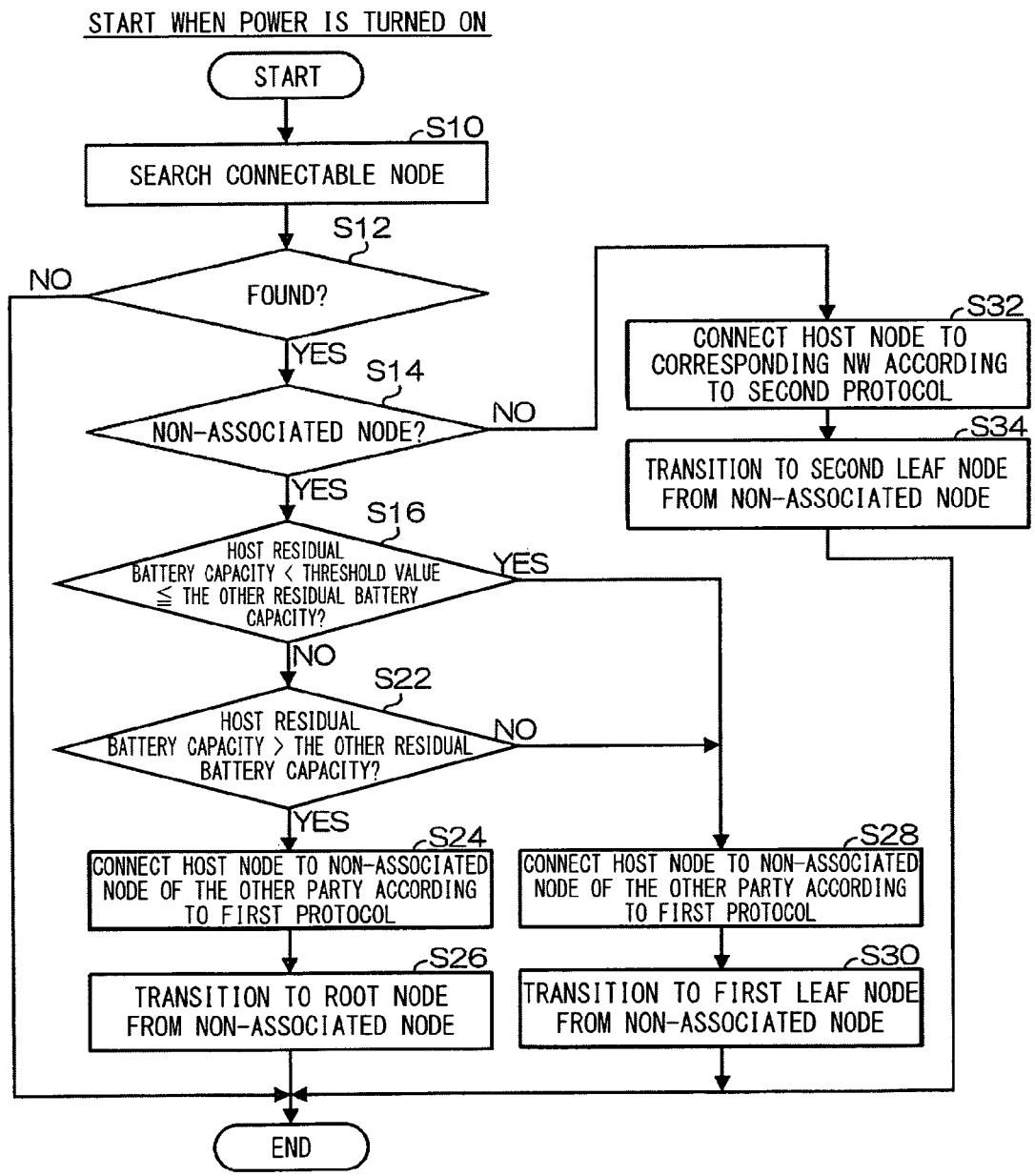
FIG. 5 is a flowchart illustrating an operation of a portable electronic device according to the present embodiment.

FIG. 5 is a flowchart illustrating an operation of the portable electronic device 1 according to the present embodiment. If the power is turned on, the portable electronic device 1 (non-associated node) searches for a connectable node by the search section 42 (step S10). Thus, it is determined whether the connectable node is found (step S12). If there is no connectable node (NO in step S12), the process is terminated.

On the other hand, if the connectable node is found by the search section 42 (YES in step S12), it is determined whether the found node is an non-associated node (step S14). If the found node is the non-associated node (YES in step S14), it is determined whether the residual battery capacity of the host node (host residual battery capacity) is smaller than a threshold value and the residual battery capacity of the other node (the other residual battery capacity) is equal to or greater than the threshold value (step S16).

If the residual battery capacity of the host node (host residual battery capacity) is greater than the threshold value, or if the residual battery capacity of the other node (the other residual battery capacity) is not equal to or greater than the threshold value (NO in step S16), it is determined whether the residual battery capacity of the host node (host residual battery capacity) is greater than the residual battery capacity of the other node (the other residual battery capacity) (step S22).

If the residual battery capacity of the host node (host residual battery capacity) is greater than the residual battery capacity of the other node (the other residual battery capacity) (YES in step S22), the host node is connected to the other non-associated node (step S24) according to the first protocol (Wi-Fi P2P), and then, transitions to the root node from the non-associated node (step S26). Then, the process is terminated.

On the other hand, if the residual battery capacity of the host node (host residual battery capacity) is smaller than the threshold value and the residual battery capacity of the other node (the other residual battery capacity) is equal to or greater than the threshold value (YES in step S16), or if the above-mentioned condition is not satisfied (NO in step S16) but the residual battery capacity of the host node (host residual battery capacity) is smaller than the residual battery capacity of the other node (the other residual battery capacity) (NO in step S22), the host node is connected to the non-associated node of the other party (step S28) according to the first protocol (Wi-Fi P2P), and then, transitions to the first leaf node from the non-associated node (step S30). Then, the process is terminated.

On the other hand, if the found node is not the non-associated node but is a connectable node (root node, branch node, or second leaf node) of the P2P network (NO in step S14), the host node is connected to the connectable node (root node, second leaf node, or branch node) of the P2P network (NW) (step S32) according to the second protocol (IEEE802. 11), and then, transitions to the second leaf node from the non-associated node (step S34). Then, the process is terminated.

Figure 6:
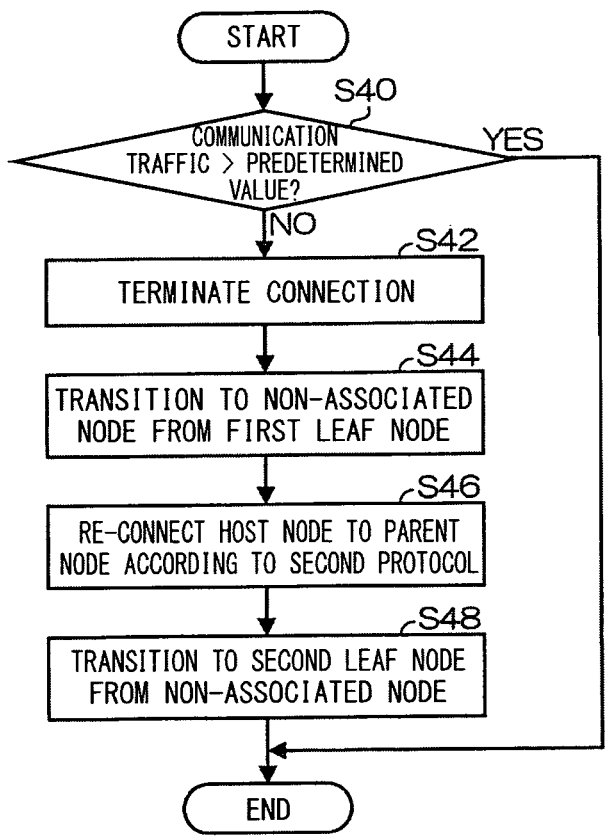
FIG. 6 is a flowchart illustrating an operation of a portable electronic device (first leaf node) according to the present embodiment.

FIG. 6 is a flowchart illustrating an operation of the portable electronic device 1 (first leaf node) according to the present embodiment. In the above-mentioned portable electronic device 1, the portable electronic device 1 connected as the first leaf node to the root node periodically executes the processes in the flowchart shown in FIG. 6. The portable electronic device 1 (first leaf node) determines whether the current communication traffic is greater than a predetermined value (step S40). Further, if the current communication traffic is greater than the predetermined value (YES in step S40), the process is terminated while maintaining the current operating state (first leaf node: node where connection to another portable electronic device is rejected).

On the other hand, if the current communication traffic is smaller than the predetermined value (NO in step S40), connection to the parent node (root node) is terminated once (step S42), and then, the host node transitions to the non-associated node from the first leaf node (step S44). Then, the host node is re-connected to the parent node (root node) according to the second protocol (IEEE802. 11) (step S46), and then, transitions to the second leaf node (node where connection to another portable electronic device is rejected but transition to the branch node is available) from the non-associated node (step S48). Then, the process is terminated.

FIGS. 7A to 7F are conceptual diagrams illustrating operations when non-associated nodes encounter each other in the present embodiment.

Figure 7A:
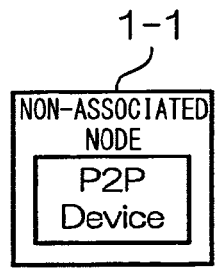
FIG. 7A is a conceptual diagram illustrating an operation when non-associated nodes encounter each other according to the present embodiment.
Figure 7B:
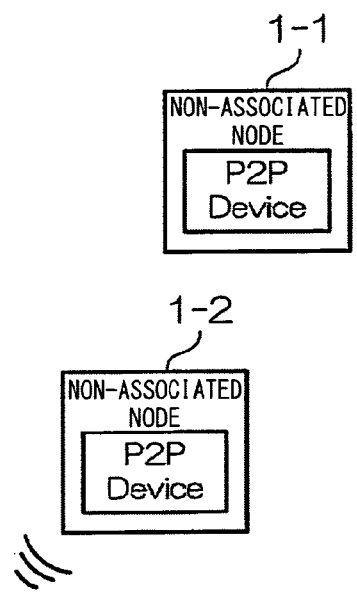
FIG. 7B is a conceptual diagram illustrating an operation when non-associated nodes encounter each other according to the present embodiment.
Figure 7C:
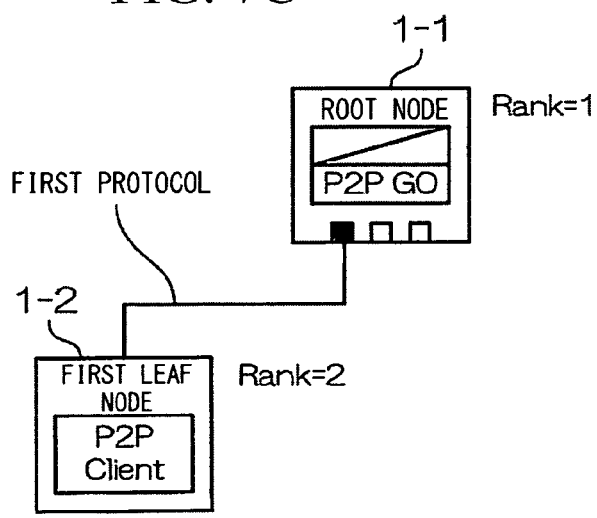
FIG. 7C is a conceptual diagram illustrating an operation when non-associated nodes encounter each other according to the present embodiment.

As shown in FIG. 7A, an non-associated node 1-1 is individually present. As shown in FIG. 7B, another non-associated node 1-2 approaches thereto. After each of the nodes detects that the other node is an non-associated node, it is determined whether the host node becomes a root node which is a parent node or a first leaf node which is a child node according to the above-mentioned connection determination condition shown in FIG. 3A. Then, as shown in FIG. 7C, the non-associated node 1-1 transitions to the root node, and the non-associated node 1-2 is connected to the root node according to the first protocol (Wi-Fi P2P) (first connection control) and then transitions to the first leaf node.

Figure 7D:
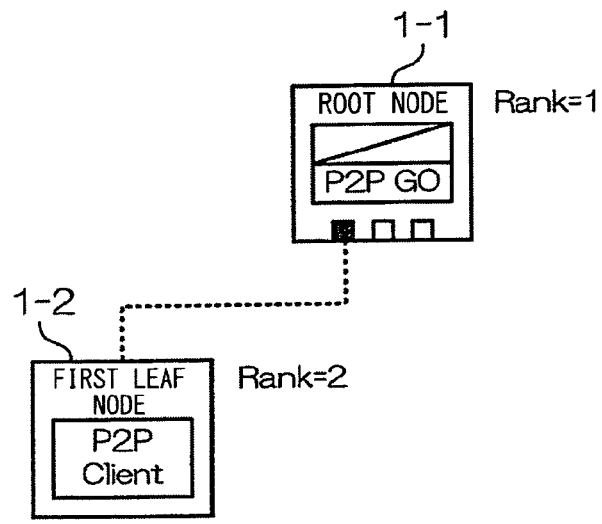
FIG. 7D is a conceptual diagram illustrating an operation when non-associated nodes encounter each other according to the present embodiment.
Figure 7E:
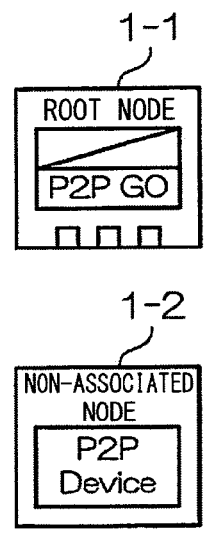
FIG. 7E is a conceptual diagram illustrating an operation when non-associated nodes encounter each other according to the present embodiment.
Figure 7F:
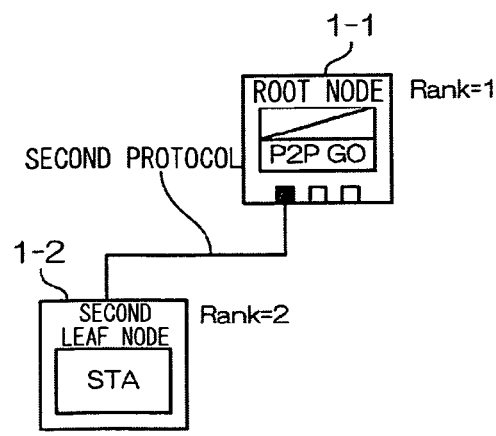
FIG. 7F is a conceptual diagram illustrating an operation when non-associated nodes encounter each other according to the present embodiment.

According to the above-mentioned flowchart shown in FIG. 6, if the communication traffic is smaller than the predetermined value, as shown in FIG. 7D, the connection of the first leaf node 1-2 to the root node 1-1 is terminated once (second connection control), and as shown in FIG. 7E, the first leaf node 1-2 transitions to the non-associated node 1-2. Then, as shown in FIG. 7F, the non-associated node 1-2 is re-connected to the root node 1-1 according to the second protocol (IEEE802. 11) (third connection control), and then, transitions to the second leaf node from the non-associated node (node where connection to another portable electronic device is rejected but transition to the branch node is available).

Here, the root node 1-1 can accept connection of two (the number of white squares □) subsequent child nodes (empty state). In the present embodiment, connection is controlled so that the child node is filled from a high-ranking node. Thus, at this time point, the second leaf node 1-2 does not transition to the branch node and becomes a connection-disabled node.

Next, a state where the host node is connected to another portable electronic device (non-associated node) from the state shown in FIG. 7C will be described with reference to FIGS. 8A to 8G.

Figure 8A:
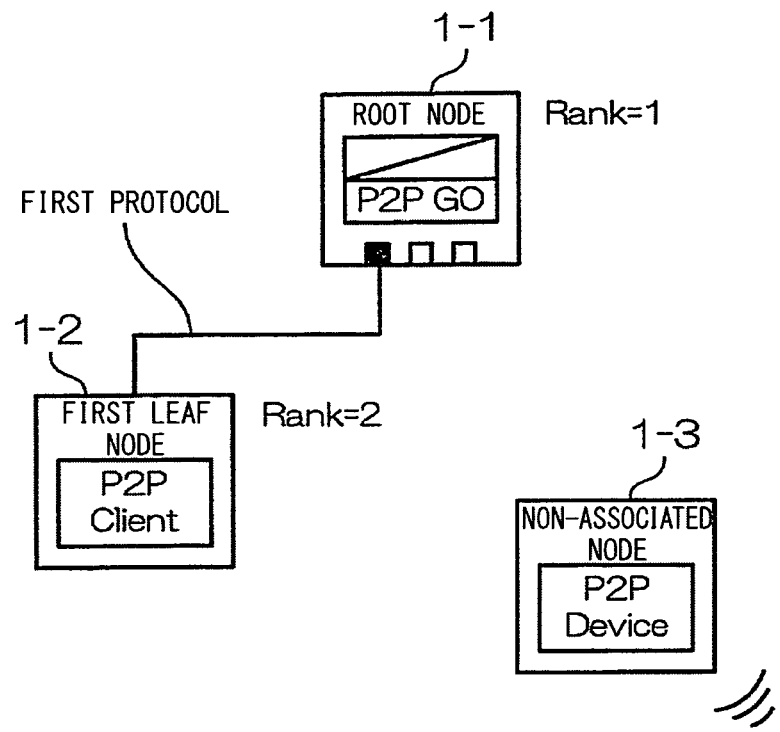
FIG. 8A is a conceptual diagram illustrating a connection example when another portable electronic device (non-associated node) comes near in the state shown in FIG. 7C, according to the present embodiment.
Figure 8B:
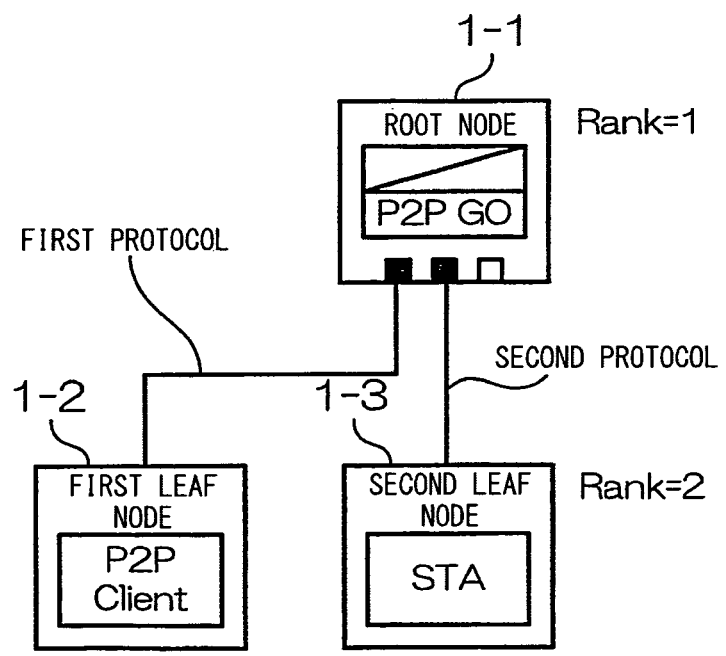
FIG. 8B is a conceptual diagram illustrating a connection example when another portable electronic device (non-associated node) comes near in the state shown in FIG. 7C, according to the present embodiment.

FIGS. 8A and 8B are conceptual diagrams illustrating connection examples when another portable electronic device (non-associated node) 1-3 comes near in the state shown in FIG. 7C, in the present embodiment. As shown in FIG. 8A, in a state where the first leaf node 1-2 is connected to the root node 1-1 according to the first protocol (Wi-Fi P2P), the non-associated node 1-3 is coming near. In this case, as shown in FIG. 8B, the non-associated node 1-3 is connected to the root node 1-1 according to the second protocol, and then, transitions to the second leaf node 1-3.

Here, the root node 1-1 may accept connection of one subsequent child node (the number of white squares □) (empty state). In the present embodiment, connection is controlled so that the child node is filled from a high-ranking node. Thus, the root node 1-1 does not transition the second leaf node 1-3 to the branch node to become a connection-disabled node.

Figure 8C:
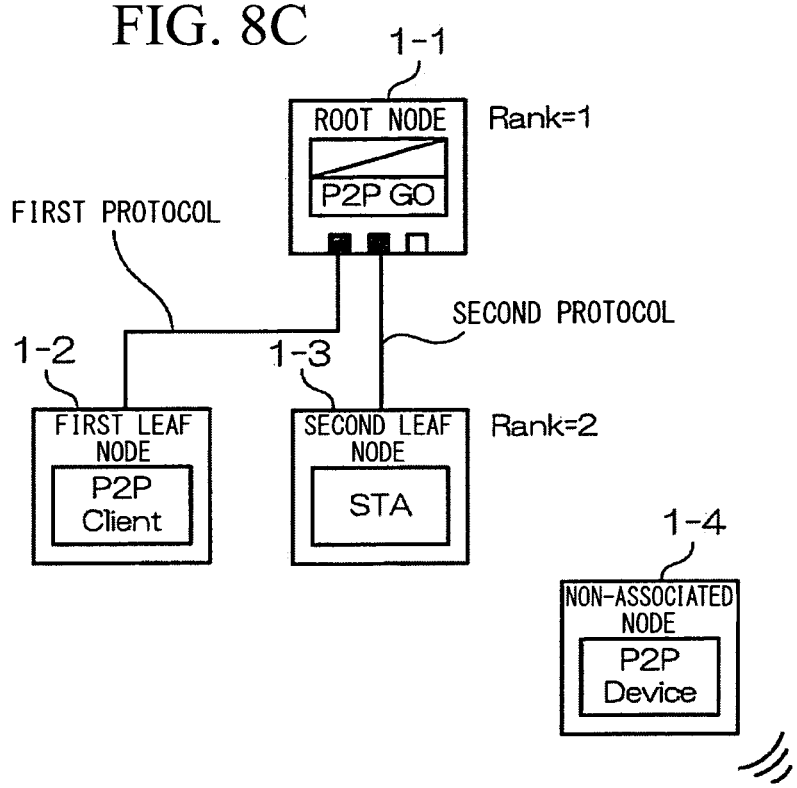
FIG. 8C is a conceptual diagram illustrating a connection example when another portable electronic device (non-associated node) comes near in the state shown in FIG. 8B, according to the present embodiment.
Figure 8D:
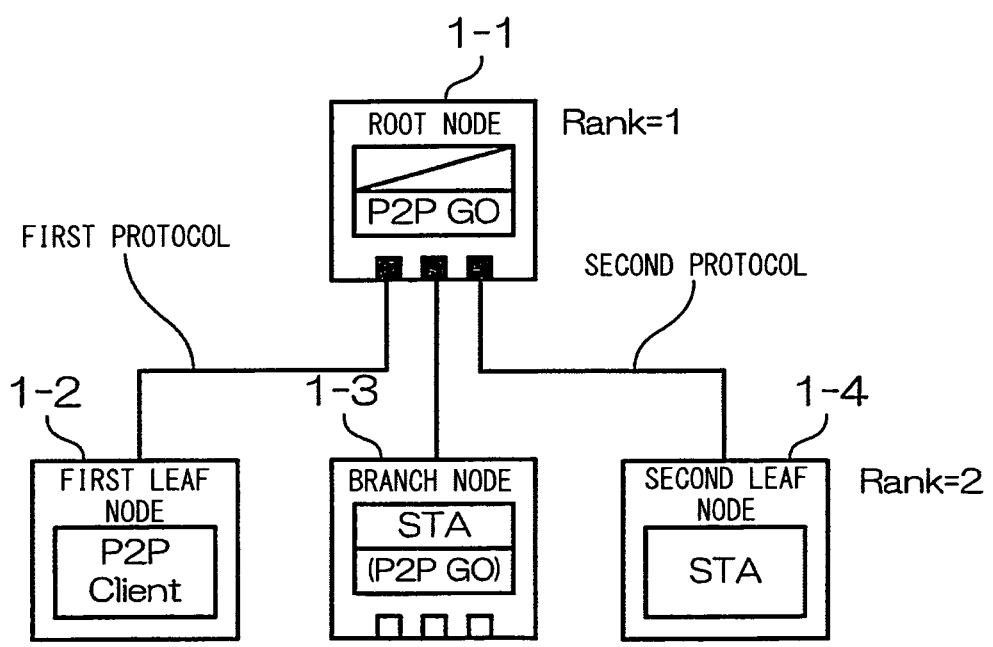
FIG. 8D is a conceptual diagram illustrating a connection example when another portable electronic device (non-associated node) comes near in the state shown in FIG. 8B, according to the present embodiment.

FIGS. 8C and 8D are conceptual diagrams illustrating connection examples when another portable electronic device (non-associated node) 1-4 comes near in the state shown in FIG. 8B, in the present embodiment. As shown in FIG. 8C, in a state where the first leaf node 1-2 is connected to the root node 1-1 according to the first protocol (Wi-Fi P2P) and the second leaf node 1-3 is connected to the root node 1-1 according to the second protocol (IEEE802. 11), the non-associated node 1-4 is coming near. In this case, as shown in FIG. 8D, the non-associated node 1-4 is connected to the root node 1-1 according to the second protocol, and then, transitions to the second leaf node 1-4.

Here, since three child nodes are connected to the root node 1-1, the root node 1-1 becomes a connection-disabled node (full state), and transitions any one of the second leaf nodes 1-3 and 1-4 to the branch node to become a connection-accepting node (empty state), and does not transition the other one of the second leaf nodes 1-3 and 1-4 to the branch node to become a connection-disabled node. Here, the root node 1-1 transitions the second leaf node 1-3 to the branch node 1-3 to become a connection-accepting node (empty state), and does not transition the second leaf node 1-4 to the branch node and makes the second leaf node 1-4 as a connection-disabled node.

In the present embodiment, FIG. 8E is a conceptual diagram illustrating a connection example when another portable electronic device (non-associated node) 1-5 comes near in the state shown in FIG. 8D. In the state shown in FIG. 8D, if the non-associated node 1-5 comes near, as shown in FIG. 8E, the non-associated node 1-5 is connected to the branch node 1-3 according to the second protocol, and then, transitions to the second leaf node 1-5.

Here, since the branch node 1-3 is still a connection-accepting node (empty state), the root node 1-1 does not transition the second leaf node 1-5 to the branch node and makes the second leaf nod 1-5 as a connection-disabled node. Thus, it is possible to prevent a child node from being uselessly connected under the second leaf node 1-5.

Figure 8F:
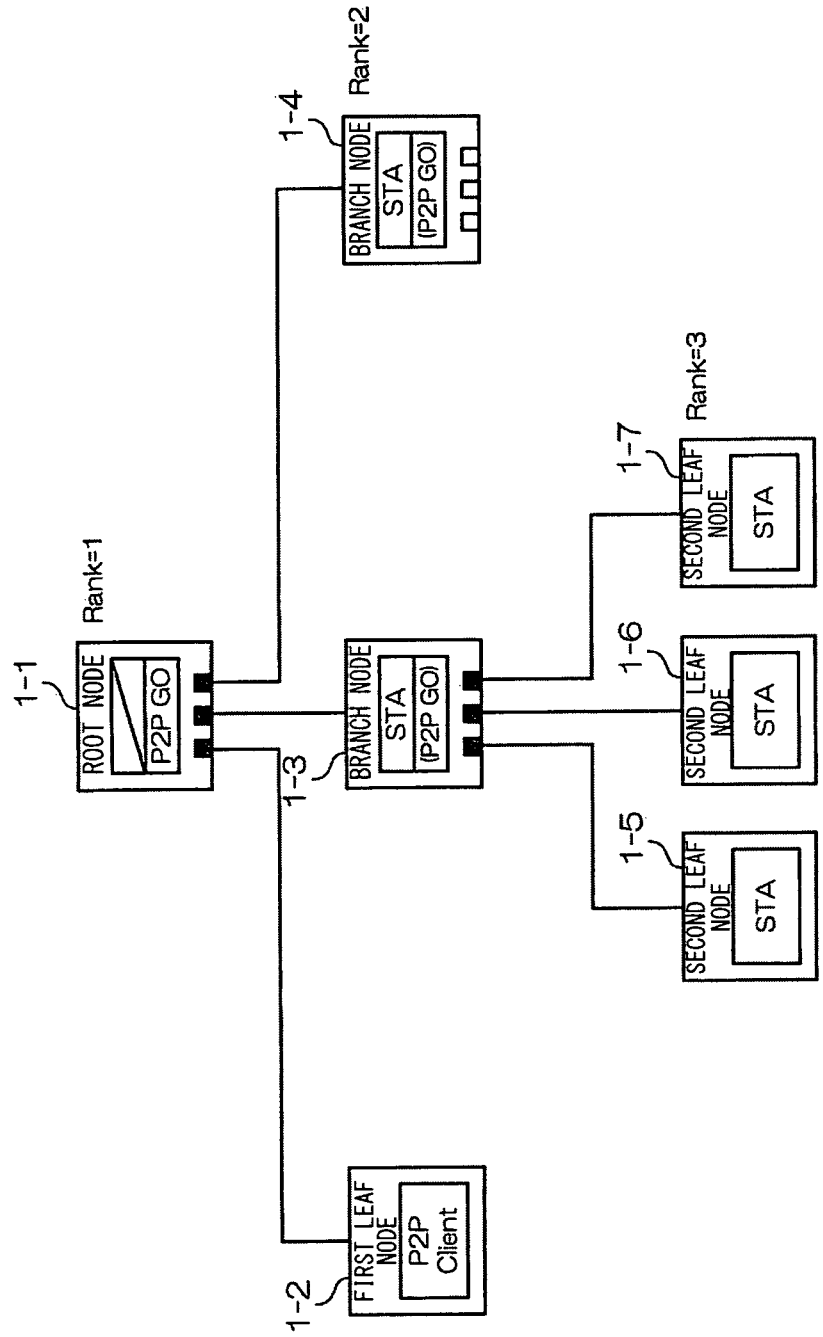
FIG. 8F is a conceptual diagram illustrating a connection example when another portable electronic device (non-associated node) comes near in the state shown in FIG. 8E, according to the present embodiment.

FIG. 8F is a conceptual diagram illustrating a connection example when other electronic devices (non-associated node) 1-6 and 1-7 approach in the state shown in FIG. 8E, in the present embodiment. In the state shown in FIG. 8E, if the other non-associated nodes (non-associated nodes) 1-6 and 1-7 approach, as shown in FIG. 8F, the non-associated nodes 1-6 and 1-7 are connected to the branch node 1-3 according to the second protocol, and then, transition to the second leaf nodes 1-6 and 1-7. Here, since the branch node 1-3 becomes a connection-disabled node (full state), the root node 1-1 transitions the second leaf node 1-4 to the branch node 1-4 to become a connection-accepting node (empty state) so that a child node is connected to a high-ranking node as much as circumstances allow, and does not transition the second leaf nodes 1-5, 1-6, and 1-7 to the branch node and make the second leaf nodes 1-5, 1-6, and 1-7 as connection-disabled nodes. Thus, it is possible to prevent a child node from being uselessly connected under the second leaf nodes 1-5, 1-6, and 1-7.

Figure 8G:
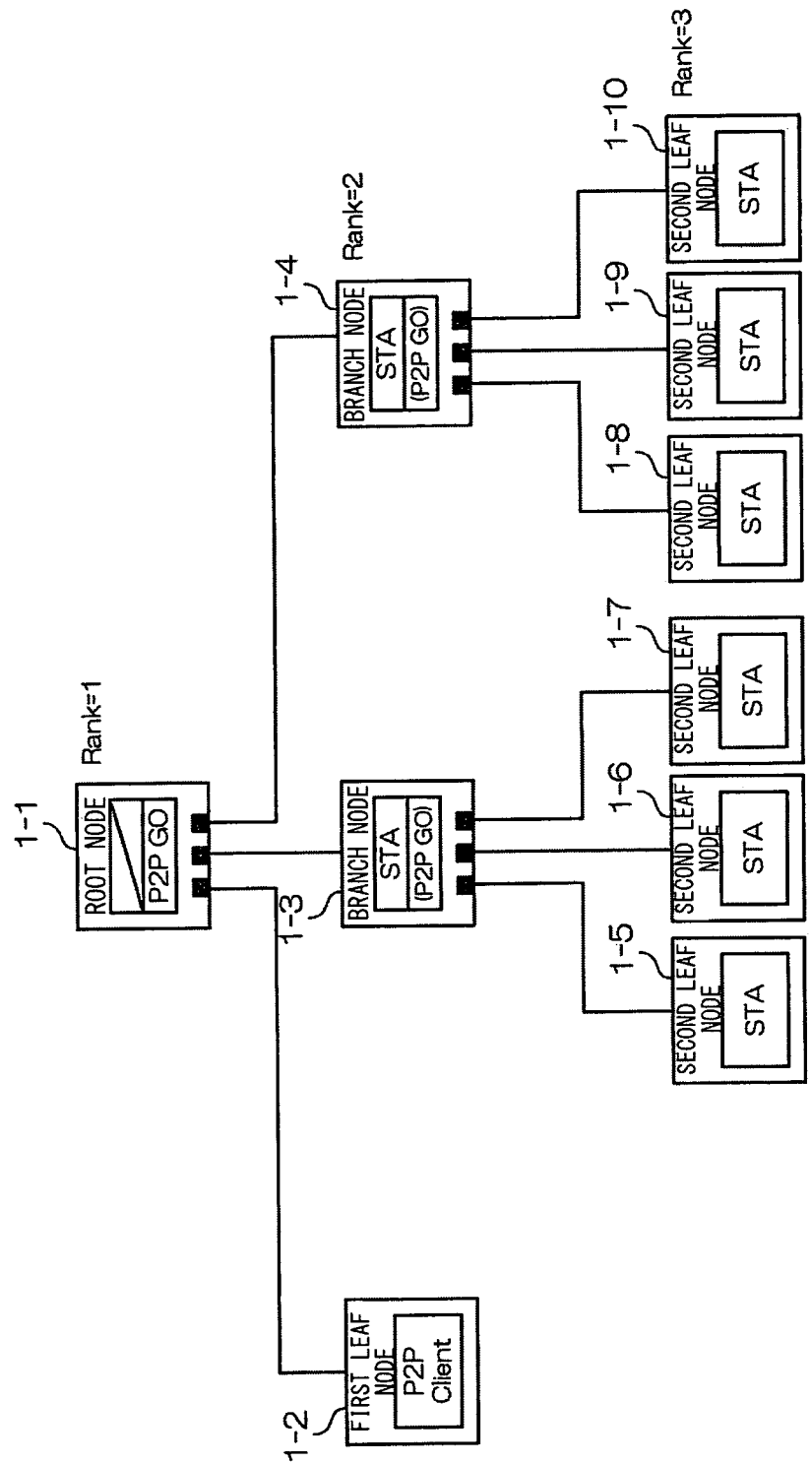
FIG. 8G is a conceptual diagram illustrating a connection example when another portable electronic device (non-associated node) comes near in the state shown in FIG. 8F, according to the present embodiment.

FIG. 8G is a conceptual diagram illustrating a connection example when other electronic devices (non-associated node) 1-8, 1-9, and 1-10 approach in the state shown in FIG. 8F, in the present embodiment. In the state shown in FIG. 8F, if the other electronic devices (non-associated nodes) 1-8, 1-9, and 1-10 approach, as shown in FIG. 8G, the non-associated nodes 1-8, 1-9, and 1-10 are connected to the branch node 1-4 according to the second protocol, and then, transition to the second leaf nodes 1-8, 1-9, and 1-10.

According to the present embodiment, as described with reference to FIGS. 8A to 8G, the P2P network is limited to three ranks of Rank=1 to 3. Thus, it is possible to configure the P2P network while suppressing deterioration of the communication performance. Further, in a building process of the P2P network, since a child node is connected from a high-ranking node as much as circumstances allow, it is possible to efficiently configure the P2P network. Here, when plural nodes that accept connection of child nodes are simultaneously present, the communication performance may also deteriorate. However, in the present embodiment, only one node constantly accepts connection of a child node. Thus, it is possible to configure the P2P network while suppressing deterioration of the communication performance.

Next, an example in which another portable electronic device (non-associated node) is connected from the state shown in FIG. 7F will be described with reference to FIGS. 9A to 9G.

Figure 9A:
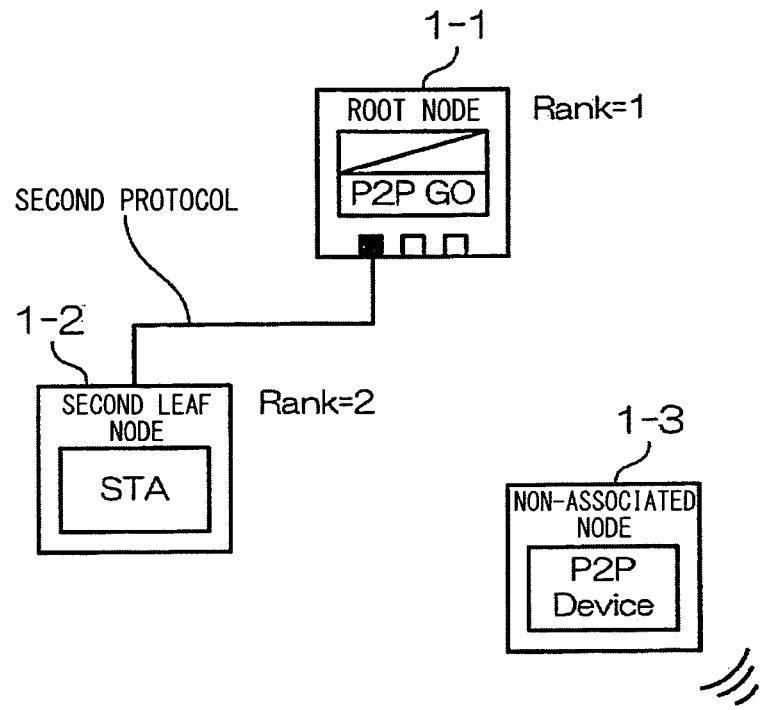
FIG. 9A is a conceptual diagram illustrating a connection example when another portable electronic device (non-associated node) comes near in the state shown in FIG. 7F, according to the present embodiment.
Figure 9B:
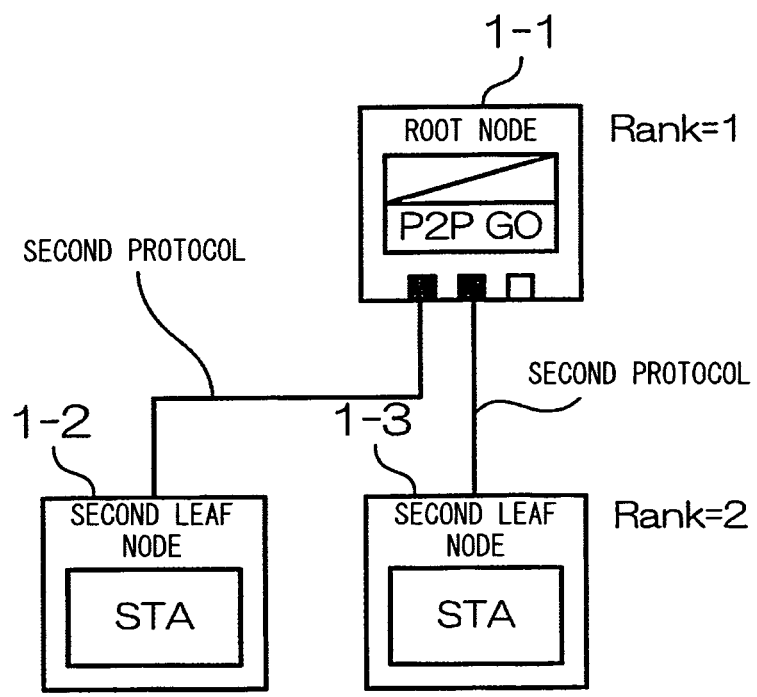
FIG. 9B is a conceptual diagram illustrating a connection example when another portable electronic device (non-associated node) comes near in the state shown in FIG. 7F, according to the present embodiment.

FIGS. 9A and 9B are conceptual diagrams illustrating connection examples when another portable electronic device (non-associated node) 1-3 comes near in the state shown in FIG. 7F, in the present embodiment. As shown in FIG. 9A, in a state where the second leaf node 1-2 is connected to the root node 1-1 according to the second protocol (IEEE802. 11), the non-associated node 1-3 is coming near. In this case, as shown in FIG. 9B, the non-associated node 1-3 is connected to the root node 1-1 according to the second protocol, and then, transitions to the second leaf node 1-3.

Here, the root node 1-1 may accept connection of one subsequent child node (the number of white squares ☐) (empty state). In the present embodiment, connection is controlled so that the child node is filled from a high-ranking node. Thus, the root node 1-1 does not transition the second leaf node 1-3 to the branch node and makes the second leaf node 1-3 as a connection-disabled node.

Figure 9C:
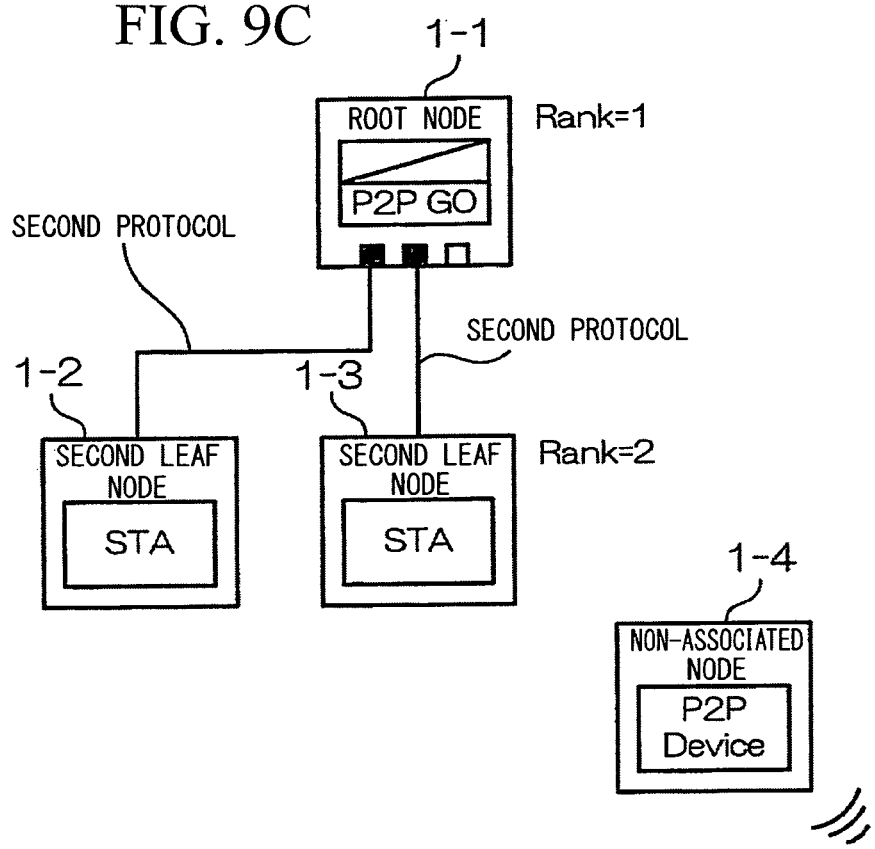
FIG. 9C is a conceptual diagram illustrating a connection example when another portable electronic device (non-associated node) comes near in the state shown in FIG. 9B, according to the present embodiment.
Figure 9D:
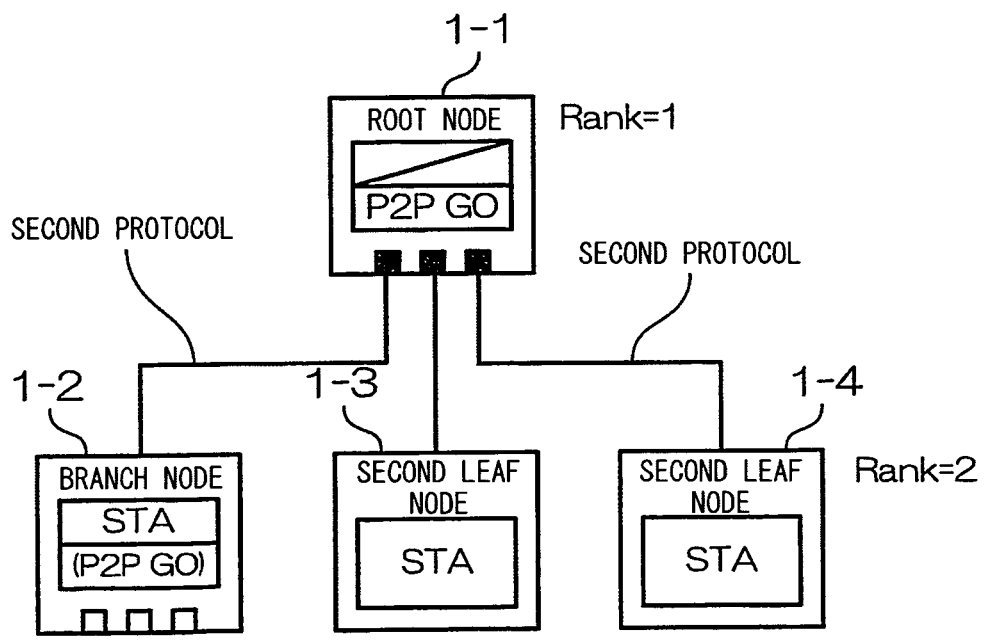
FIG. 9D is a conceptual diagram illustrating a connection example when another portable electronic device (non-associated node) comes near in the state shown in FIG. 9B, according to the present embodiment.

FIGS. 9C and 9D are conceptual diagrams illustrating connection examples when another portable electronic device (non-associated node) 1-4 comes near in the state shown in FIG. 9B, in the present embodiment. As shown in FIG. 9C, in a state where the second leaf node 1-2 and the second leaf node 1-3 are connected to the root node 1-1 according to the second protocol (IEEE802. 11), the non-associated node 1-4 is coming near. In this case, as shown in FIG. 9D, the non-associated node 1-4 is connected to the root node 1-1 according to the second protocol, and then, transitions to the second leaf node 1-4.

Here, since three child nodes are connected to the root node 1-1, the root node 1-1 becomes a connection-disabled node (full state), and transitions the second leaf node 1-2 to the branch node 1-2 to become a connection-accepting node (empty state), and does not transition the second leaf nodes 1-3 and 1-4 to the branch node and make the second leaf nodes 1-3 and 1-4 as connection-disabled nodes.

Figure 9E:
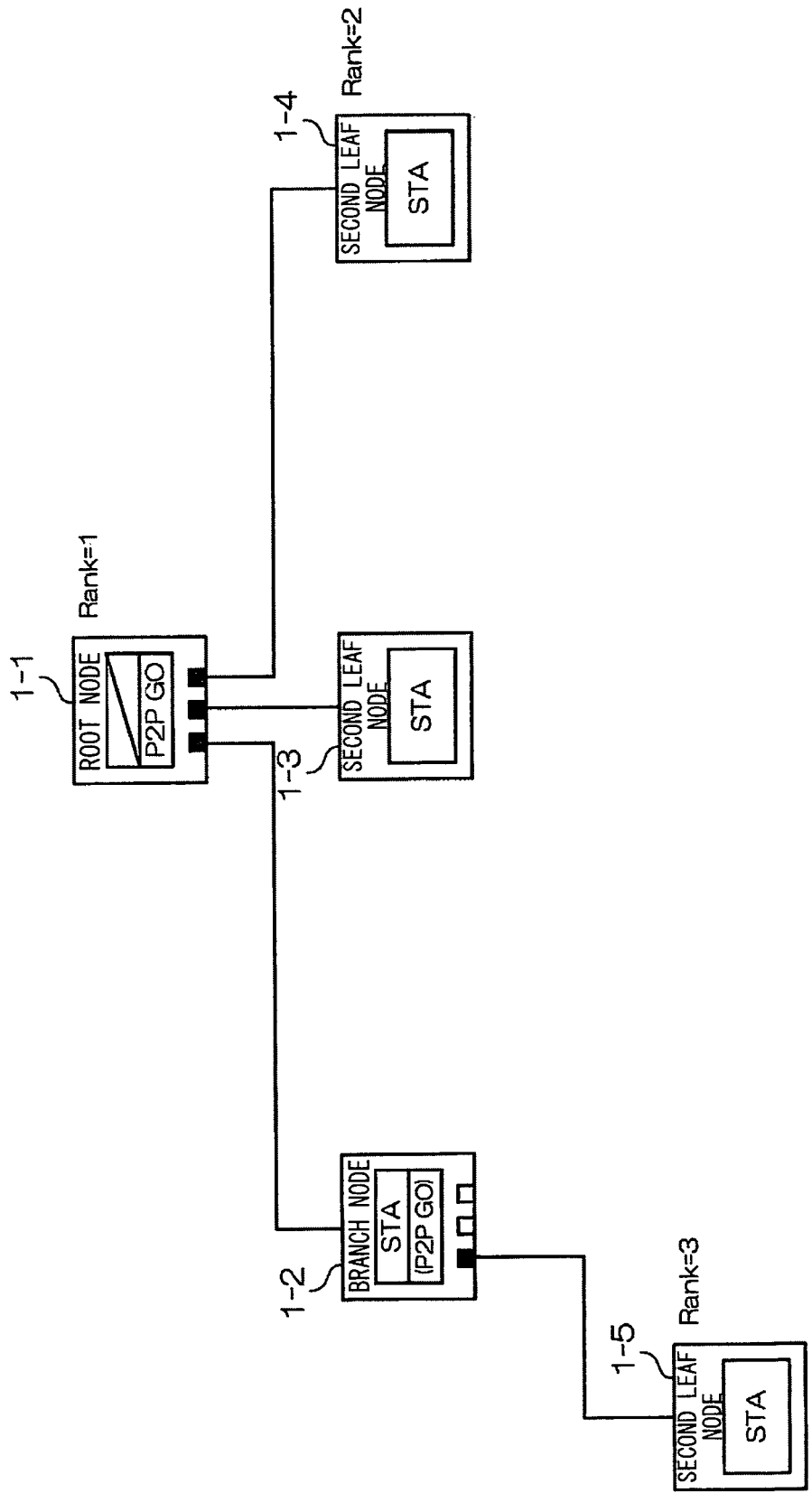
FIG. 9E is a conceptual diagram illustrating a connection example when another portable electronic device (non-associated node) comes near in the state shown in FIG. 9D, according to the present embodiment.

FIG. 9E is a conceptual diagram illustrating a connection example when another portable electronic device (non-associated node) 1-5 comes near in the state shown in FIG. 9D, in the present embodiment. If the non-associated node 1-5 comes near in the state shown in FIG. 9D, as shown in FIG. 9E, the non-associated node 1-5 is connected to the branch node 1-2 according to the second protocol, and then, transitions to the second leaf node 1-5. Here, since the branch node 1-2 is still a connection-accepting node (empty state), the root node 1-1 does not transition the second leaf node 1-5 to the branch node and makes the second leaf node 1-5 as a connection-disabled node. Thus, it is possible to prevent a child node from being uselessly connected under the second leaf node 1-5.

Figure 9F:
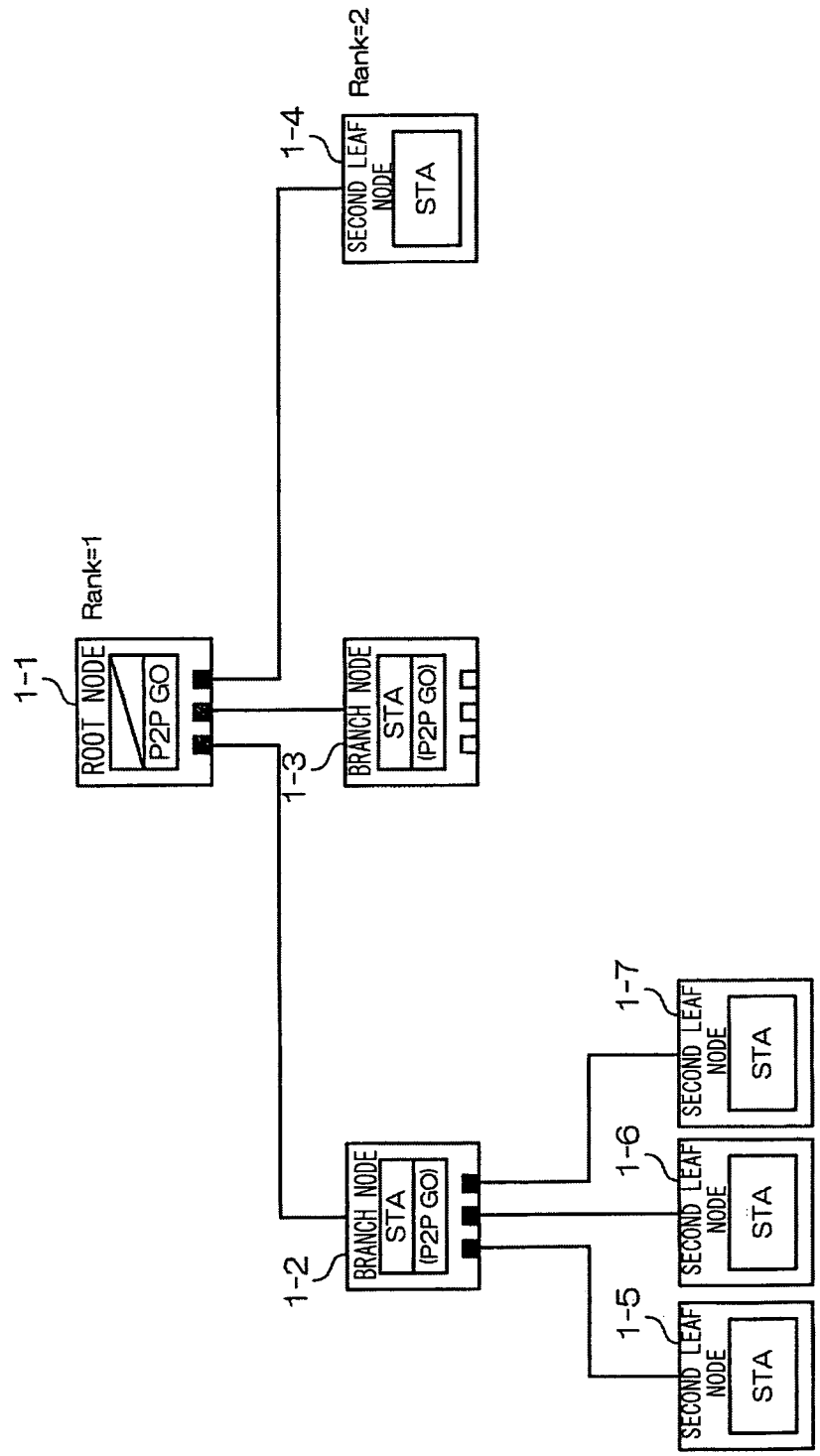
FIG. 9F is a conceptual diagram illustrating a connection example when another portable electronic device (non-associated node) comes near in the state shown in FIG. 9E, according to the present embodiment.

FIG. 9F is a conceptual diagram illustrating a connection example when other portable electronic devices (non-associated node) 1-6 and 1-7 approach in the state shown in FIG. 9E, in the present embodiment. In the state shown in FIG. 9E, if the other portable electronic devices (non-associated nodes) 1-6 and 1-7 approach, as shown in FIG. 9F, the non-associated nodes 1-6 and 1-7 are connected to the branch node 1-2 according to the second protocol, and then, transition to the second leaf nodes 1-6 and 1-7. Here, since the branch node 1-2 is a connection-disabled node (full state), the root node 1-1 transitions the second leaf node 1-3 to the branch node 1-3 to become a connection-accepting node (empty state) so that a child node is connected from a high-ranking node as much as circumstances allow, and does not transition the second leaf nodes 1-5, 1-6, and 1-7 to the branch node and make the second leaf nodes 1-5, 1-6, and 1-7 as connection-disabled nodes. Thus, it is possible to prevent a child node from being uselessly connected under the second leaf nodes 1-5, 1-6, and 1-7.

Figure 9G:
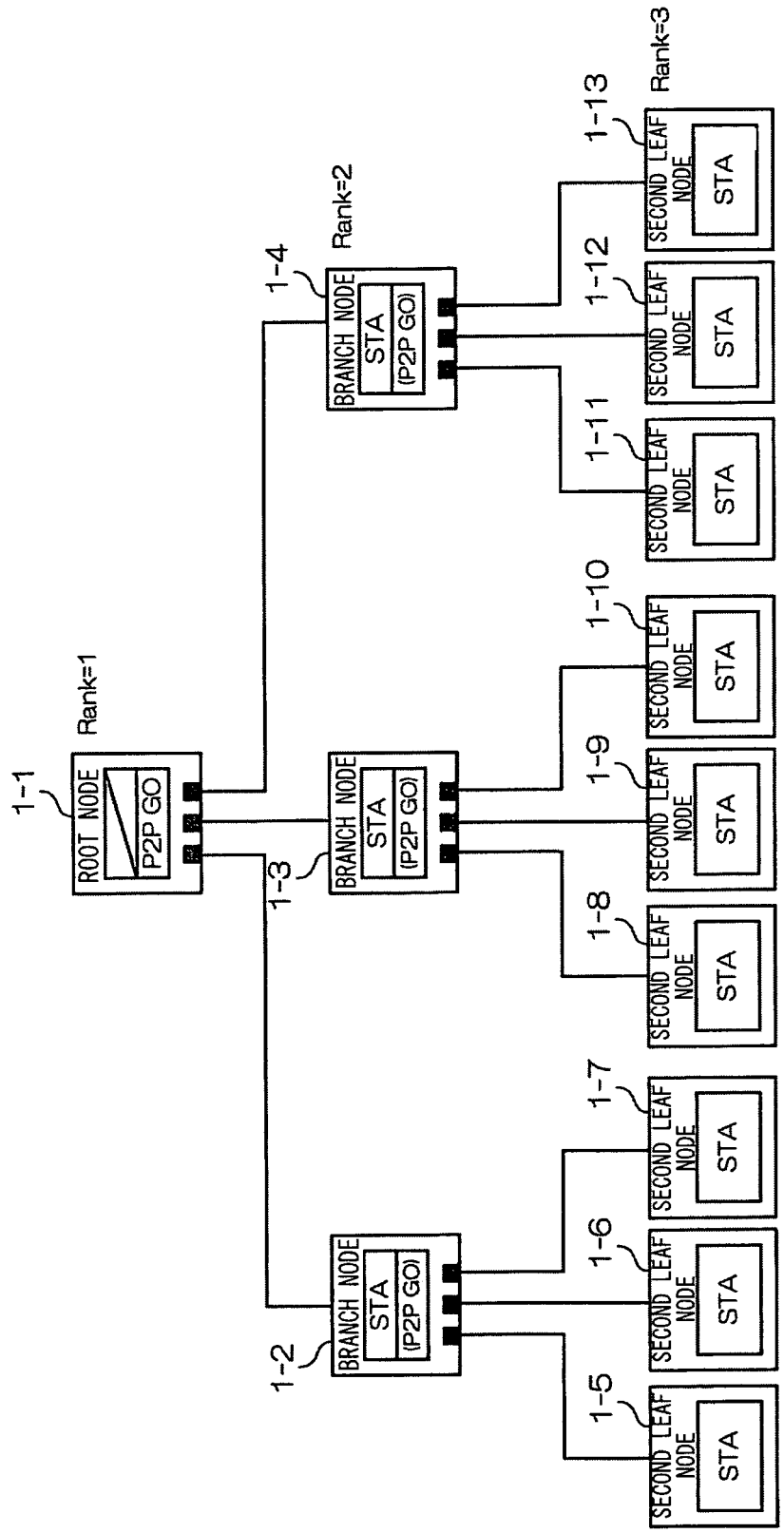
FIG. 9G is a conceptual diagram illustrating a connection example when another portable electronic device (non-associated node) comes near in the state shown in FIG. 9F, according to the present embodiment.

FIG. 9G is a conceptual diagram illustrating a connection example when other portable electronic devices (non-associated nodes) 1-8, 1-9, 1-10, 1-11, 1-12, and 1-13 approach in the state shown in FIG. 9F, in the present embodiment. If the other portable electronic devices (non-associated nodes) 1-8, 1-9, and 1-10 approach in the state shown in FIG. 9F, the non-associated nodes 1-8, 1-9, and 1-10 are connected to the branch node 1-3 according to the second protocol, and then, transition to the second leaf nodes 1-8, 1-9, and 1-10, as shown in FIG. 9G. At this stage, the root node 1-1 transitions the second leaf node 1-4 to the branch node 1-4 to become a connection-accepting node (empty state), and does not transition the second leaf nodes 1-8, 1-9, and 1-10 to the branch node and make the second leaf nodes 1-8, 1-9, and 1-10 as connection-disabled nodes.

Next, if other portable electronic devices (non-associated nodes) 1-11, 1-12, and 1-13 approach, the non-associated nodes 1-11, 1-12, and 1-13 are connected to the branch node 1-4 according to the second protocol, and then, transition to the second leaf nodes 1-11, 1-12, and 1-13. Here, the root node 1-1 does not transition the second leaf nodes 1-11, 1-12, and 1-13 to the branch node and make the second leaf nodes 1-11, 1-12, and 1-13 as connection-disabled nodes.

According to the embodiment, as described with reference to FIGS. 9A to 9G the P2P network is limited to three ranks of Rank=1 to 3. Thus, it is possible to configure the P2P network while suppressing deterioration of the communication performance. Further, in a building process of the P2P network, since a child node is connected from a high-ranking node as much as circumstances allow, it is possible to efficiently configure the P2P network. Additionally, when plural nodes that accept connection of child nodes are simultaneously present, the communication performance may also deteriorate. However, in the present embodiment, only one node constantly accepts a child node. Thus, it is possible to configure the P2P network while suppressing deterioration of the communication performance.

Further, when communication traffic is small, by re-connecting the first leaf node 1-2 connected by the first protocol (Wi-Fi P2P) as the second leaf node 1-2 by the second protocol (IEEE802. 11), it is possible to build the P2P network with 13 portable electronic devices 1 (when one parent node accepts connection of three child nodes and three ranks are provided).

Next, when P2P networks configured by plural portable electronic devices 1 encounter each other, a method of rebuilding the P2P networks will be described.

Figure 10:
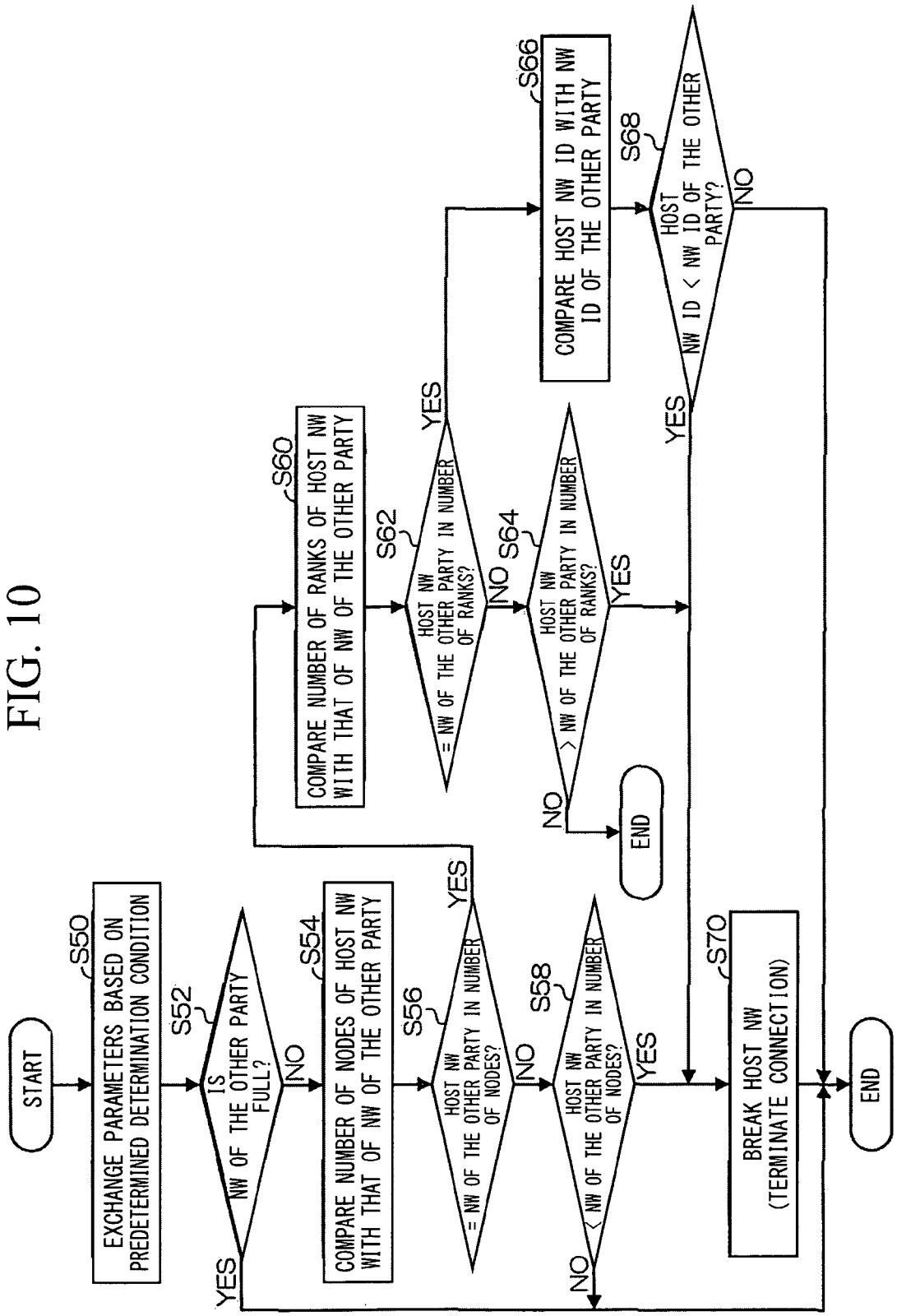
FIG. 10 is a flowchart illustrating a method for rebuilding P2P networks when the P2P networks encounter each other according to the present embodiment.

FIG. 10 is a flowchart illustrating a method of rebuilding P2P networks when the P2P networks encounter each other, in the present embodiment. When the P2P networks encounter each other, a root node in each P2P network executes the processes in the flowchart shown in FIG. 10.

The root nodes exchange parameters based on the predetermined determination conditions shown in FIG. 3B ("connection status of the other network", "number of nodes", "number of ranks", and "cluster (NW) ID") (step S50). Then, it is determined whether the P2P network of the other party is in the full state based on the connection status of the other network (step S52). Further, if the P2P network of the other party is in the full state (YES in step S52), since the rebuilding of the P2P network becomes a large load, the process is terminated without rebuilding the P2P network.

On the other hand, if the P2P network of the other party is not in the full state (NO in step S52), the number of nodes of the host P2P network is compared with that of the P2P network of the other party (step S54), and it is determined whether the number of nodes of the host P2P network is the same as that of the P2P network of the other party (step S56). If both of the number of nodes of the host P2P network and the number of nodes of the P2P network of the other party are not the same (NO in step S56), it is determined whether the number of nodes of the host P2P network is smaller than the number of nodes of the P2P network of the other party (step S58). If the number of nodes of the host P2P network is smaller than the number of nodes of the P2P network of the other party (YES in step S58), the host P2P network is broken (connection of all nodes is terminated) (step S70), and the process is terminated. On the other hand, if the number of nodes of the host P2P network is not smaller than (that is, greater than) the number of nodes of the P2P network of the other party (NO in step S58), the host P2P network is not broken, and the process is terminated.

Since the portable electronic device 1 of which the connection is terminated becomes the non-associated node 1a, the portable electronic device 1 is connected to the P2P network of the other party according to the above-mentioned flowchart in FIG. 5, to rebuild the P2P network.

On the other hand, if both of the number of nodes of the host P2P network and the number of nodes of the P2P network of the other party are the same (YES in step S56), the number of ranks of the host P2P network is compared with the number of ranks of the P2P network of the other party (step S60), and it is determined whether the number of ranks of the host P2P network and the number of ranks of the P2P network of the other party are the same (step S62). If both of the number of ranks of the host P2P network and the number of ranks of the P2P network of the other party are not the same (NO in step S62), it is determined whether the number of ranks of the host P2P network is greater than the number of ranks of the P2P network of the other party (step S64). If the number of ranks of the host P2P network is greater than the number of ranks of the P2P network of the other party (YES in step S64), the host P2P network is broken (all the node connections are terminated) (step S70), and the process is terminated. On the other hand, if the number of ranks of the host P2P network is not greater than (that is, smaller than) the number of ranks of the P2P network of the other party (NO in step S64), the host P2P network is not broken, and the process is terminated.

Since the portable electronic device 1 of which the connection is terminated becomes the non-associated node 1a, the portable electronic device 1 is connected to the P2P network of the other party according to the above-mentioned flowchart shown in FIG. 5, to rebuild the P2P network. Thus, the number of ranks after rebuilding can be reduced.

On the other hand, if both of the number of ranks of the host P2P network and the number of ranks of the P2P network of the other party are the same (YES in step S62), an ID of the host P2P network is compared with an ID of the P2P network of the other party (step S66), and it is determined whether the ID of the host P2P network is smaller than the ID of the P2P network of the other party (step S68). If the ID of the host P2P network is smaller than the ID of the P2P network of the other party (YES in step S68), the host P2P network is broken (all the node connections are terminated) (step S70), and the process is terminated. On the other hand, if the ID of the host P2P network is not smaller than (that is, greater than) the ID of the P2P network of the other party (NO in step S68), the host P2P network is not broken, and the process is terminated.

Since the portable electronic device 1 of which the connection is terminated becomes the non-associated node 1a, the portable electronic device 1 is connected to the P2P network of the other party according to the above-mentioned flowchart shown in FIG. 5, to rebuild the P2P network. Thus, the rebuilding can be performed by terminating any one of P2P network.

Figure 11:
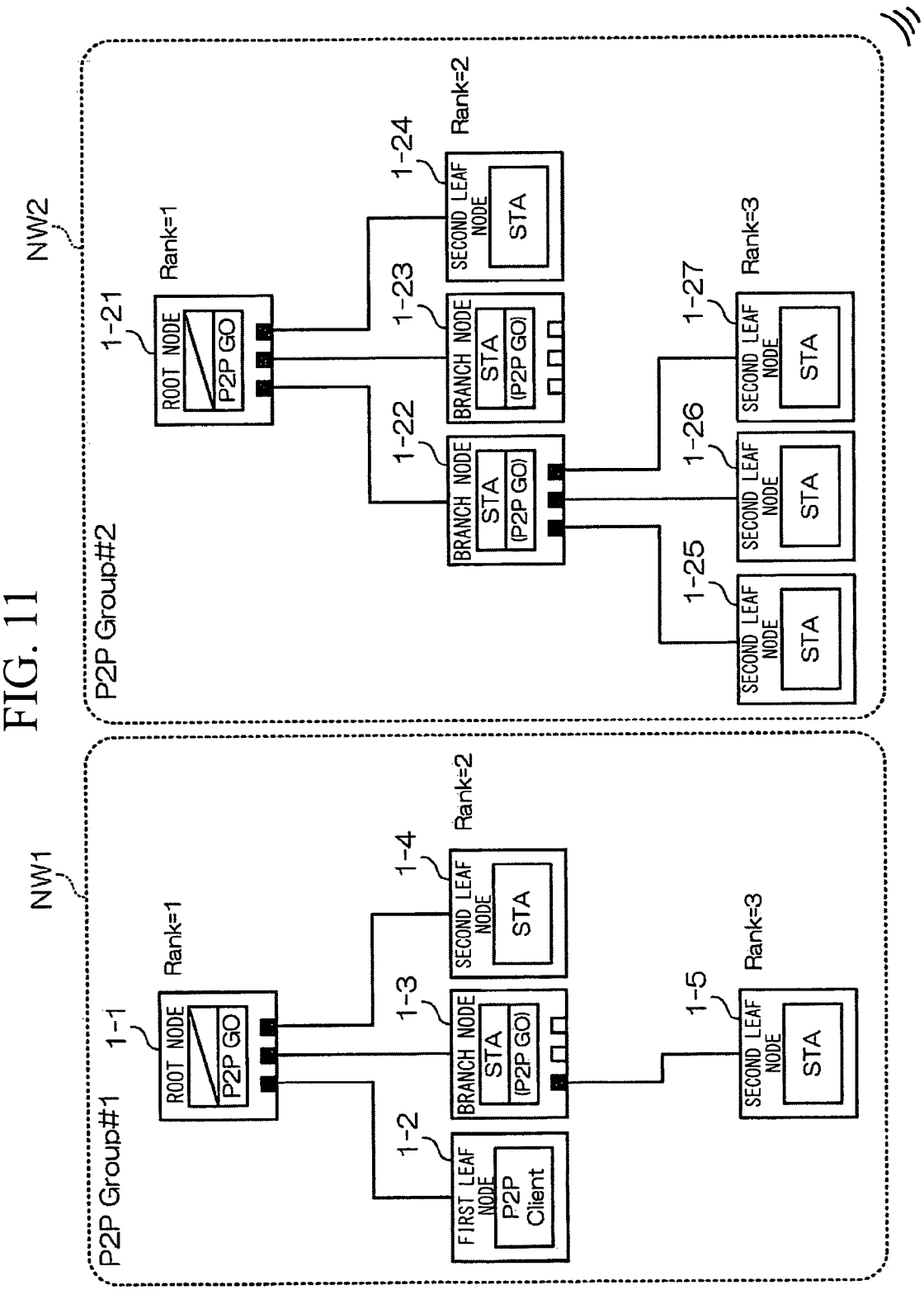
FIG. 11 is a conceptual diagram illustrating an example of rebuilding P2P networks when the P2P networks encounter each other according to the present embodiment.
Figure 12:
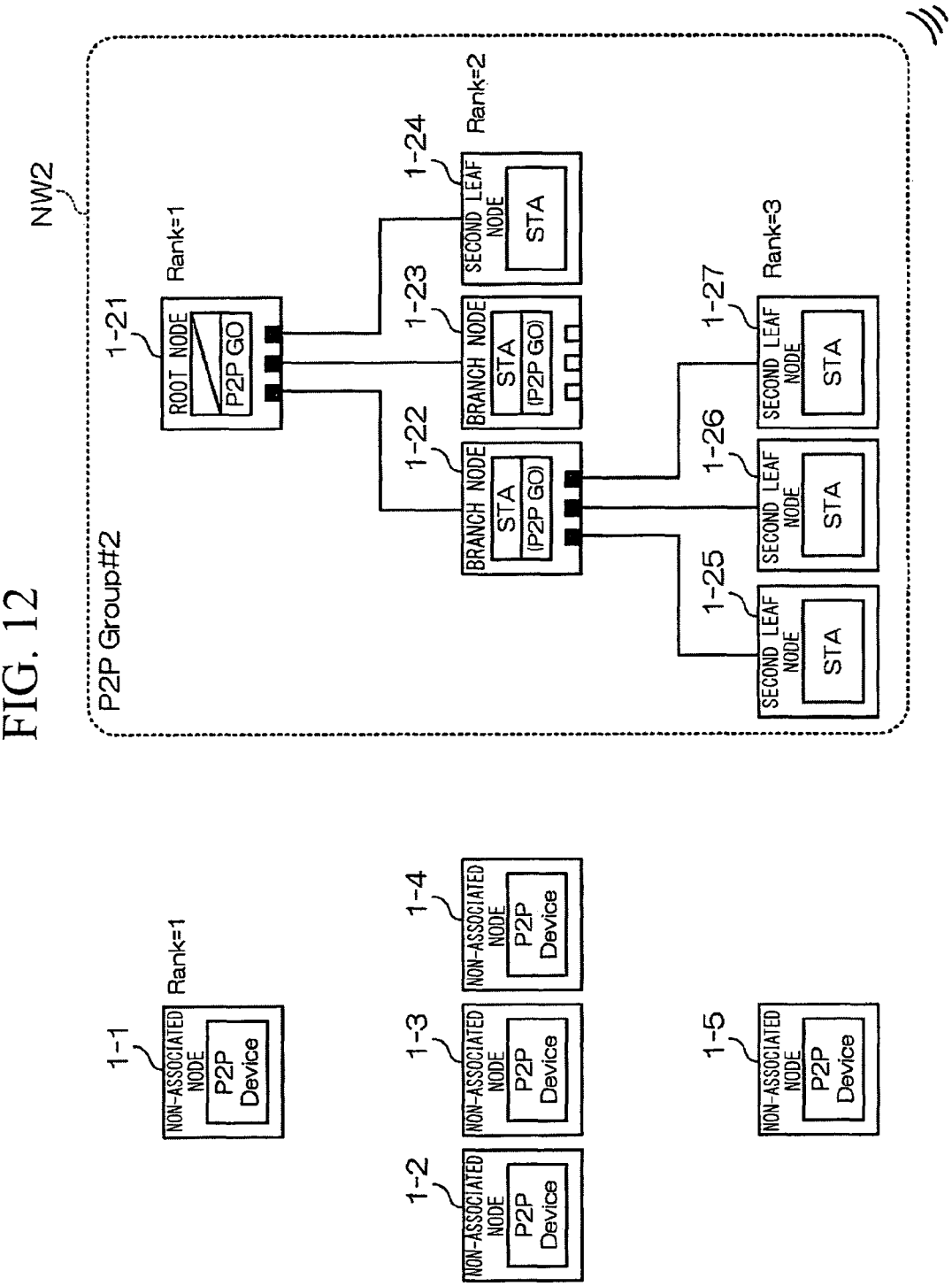
FIG. 12 is a conceptual diagram illustrating an example of rebuilding P2P networks when the P2P networks encounter each other according to the present embodiment.
Figure 13:
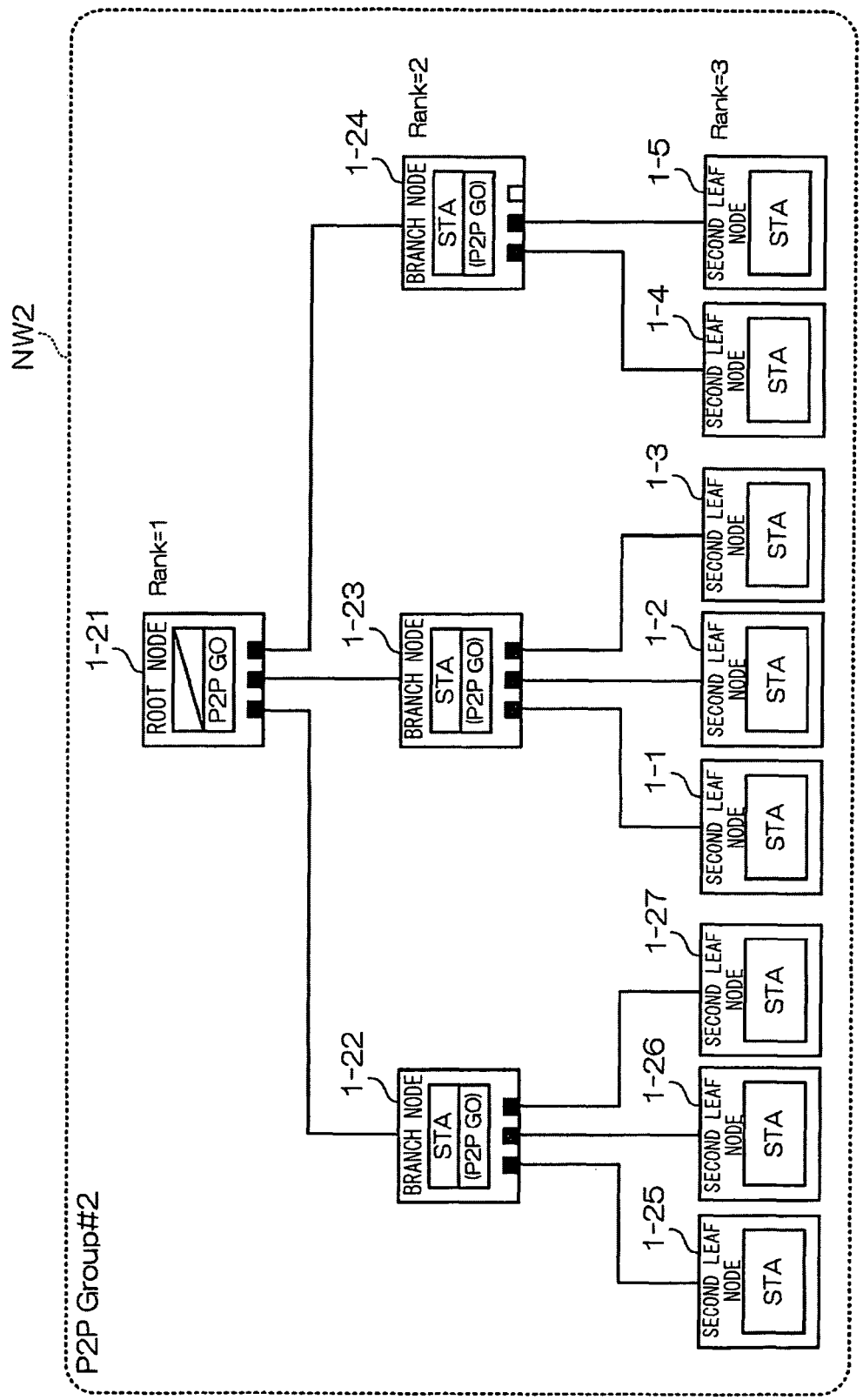
FIG. 13 is a conceptual diagram illustrating an example of rebuilding P2P networks when the P2P networks encounter each other according to the present embodiment.

FIGS. 11 to 13 are conceptual diagrams illustrating an example of rebuilding P2P networks when the P2P networks encounter each other in the present embodiment.

First, as shown in FIG. 11, it is assumed that two P2P networks NW1 and NW2 encounter each other. In the P2P network NW1, a first leaf node 1-2, a branch node 1-3, and a second leaf node 1-4 are connected to a root node 1-1. Further, a second leaf node 1-5 is connected to the branch node 1-3.

On the other hand, in the P2P network NW2, a branch node 1-22, a branch node 1-23, and a second leaf node 1-24 are connected to a root node 1-21. Further, second leaf nodes 1-25, 1-26, and 1-27 are connected to the branch node 1-22.

Accordingly, in the example shown in FIG. 11, the number of nodes of the P2P network NW1 is "5" including the root node 1-1, and the number of nodes of the P2P network NW2 is "7" including the root node 1-21. Thus, according to the above-mentioned connection determination condition shown in FIG. 3B and the flowchart shown in FIG. 10, in the P2P network NW1, the host P2P network is broken. Accordingly, the P2P network NW1 terminates connection of all the nodes to become non-associated nodes 1-1 to 1-5, as shown in FIG. 12. The P2P network NW2 is not broken and maintains the state as it is.

Next, the non-associated nodes 1-1 to 1-5 are connected to the P2P network NW2 as shown in FIG. 13, according to the above-mentioned flowchart shown in FIG. 5. First, the non-associated nodes 1-1 to 1-3 are connected to the branch node 1-23 that is a connection-accepting node (empty state) in the P2P network NW2 as shown in FIG. 13, and then, transition to the second leaf nodes 1-1 to 1-3.

Then, the second leaf node 1-24 shown in FIG. 12 transitions to the branch node 1-24 to become a connection-accepting node (empty state). Further, as shown in FIG. 13, the non-associated nodes 1-4 and 1-5 are connected to the branch node 1-24, and then, transition to the second leaf nodes 1-4 and 1-5. Thus, the rebuilding when the P2P networks NW1 and NW2 encounter each other is terminated.

Figure 14:
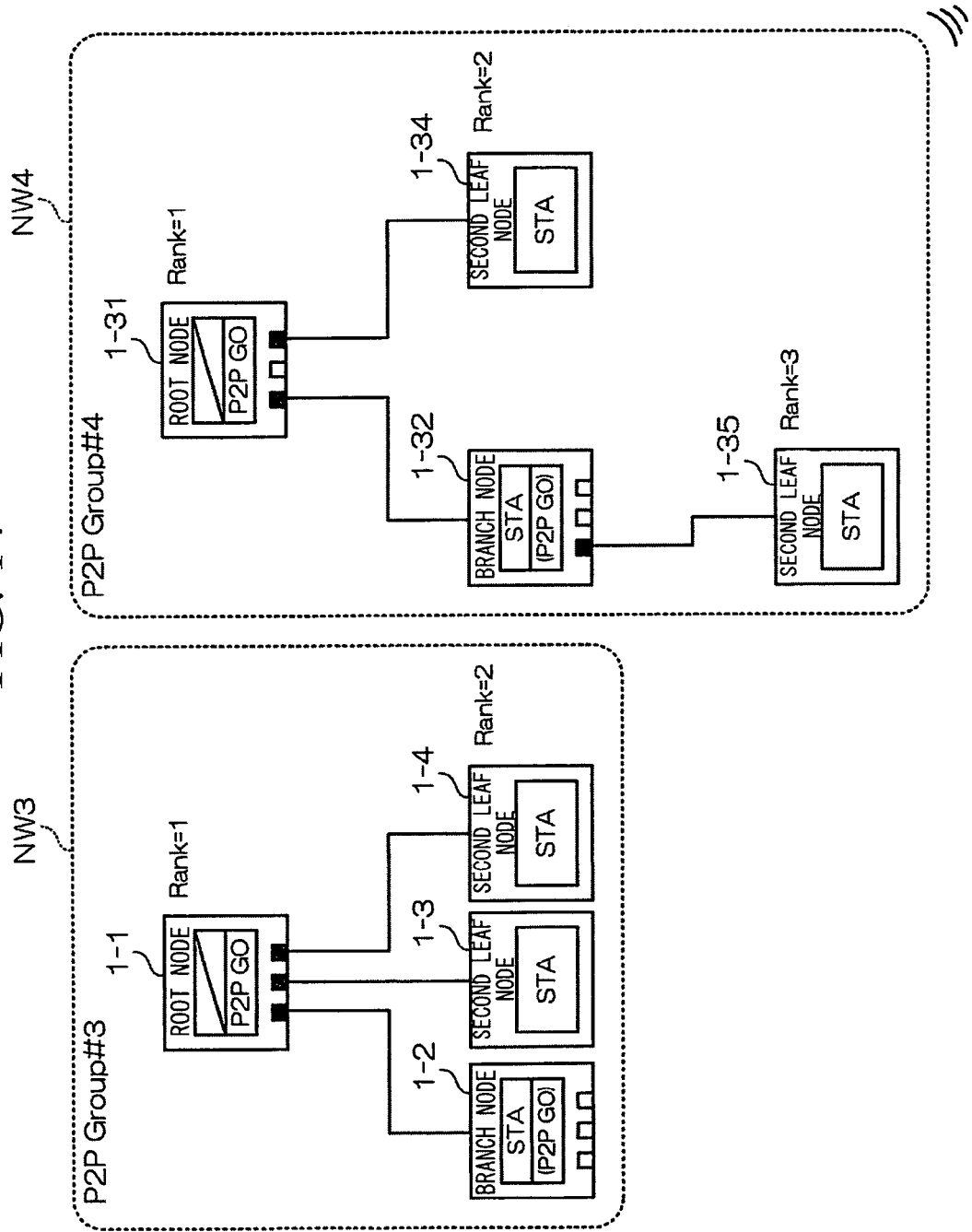
FIG. 14 is a conceptual diagram illustrating another example of rebuilding P2P networks when the P2P networks encounter each other according to the present embodiment.
Figure 15:
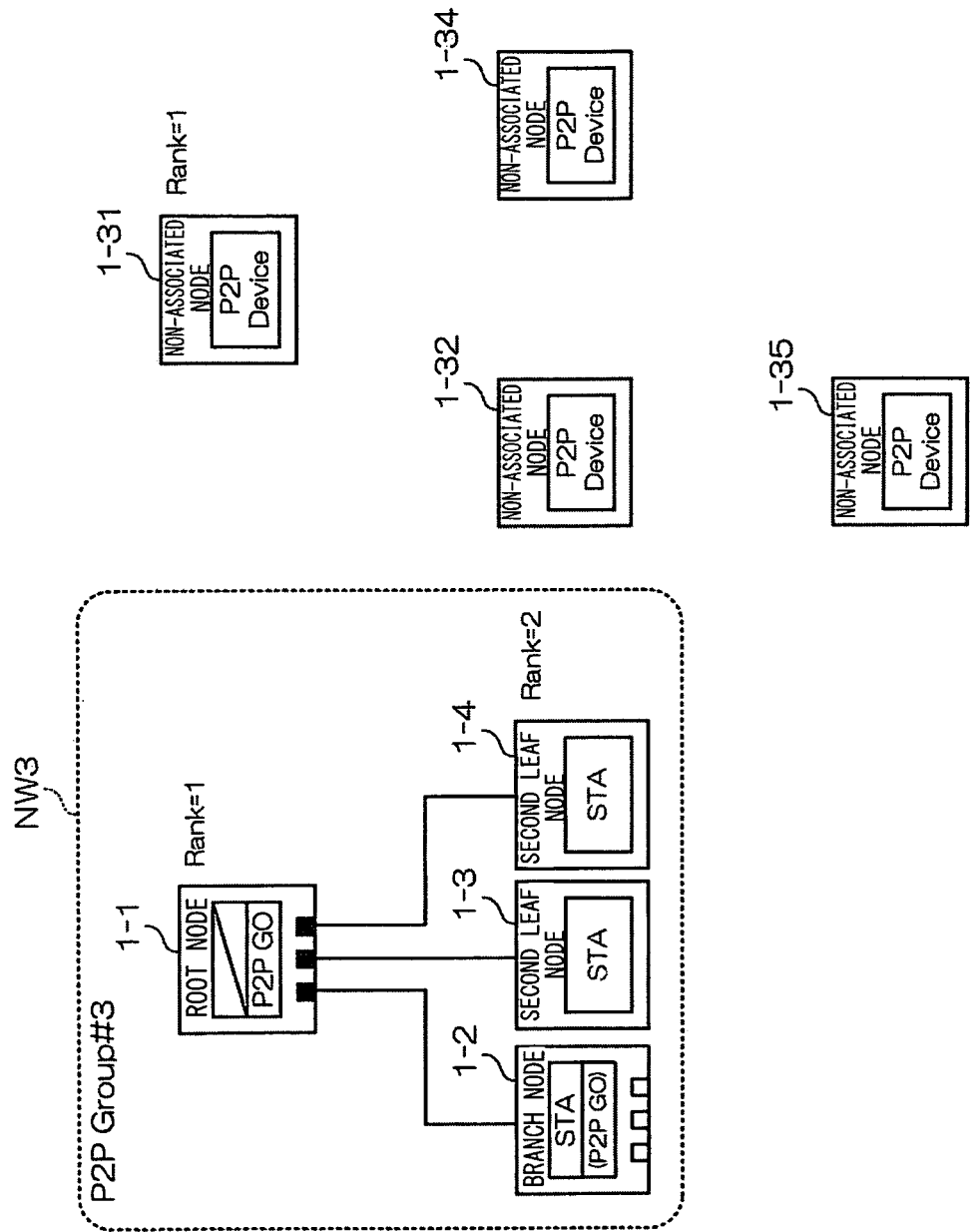
FIG. 15 is a conceptual diagram illustrating another example of rebuilding P2P networks when the P2P networks encounter each other according to the present embodiment.
Figure 16:
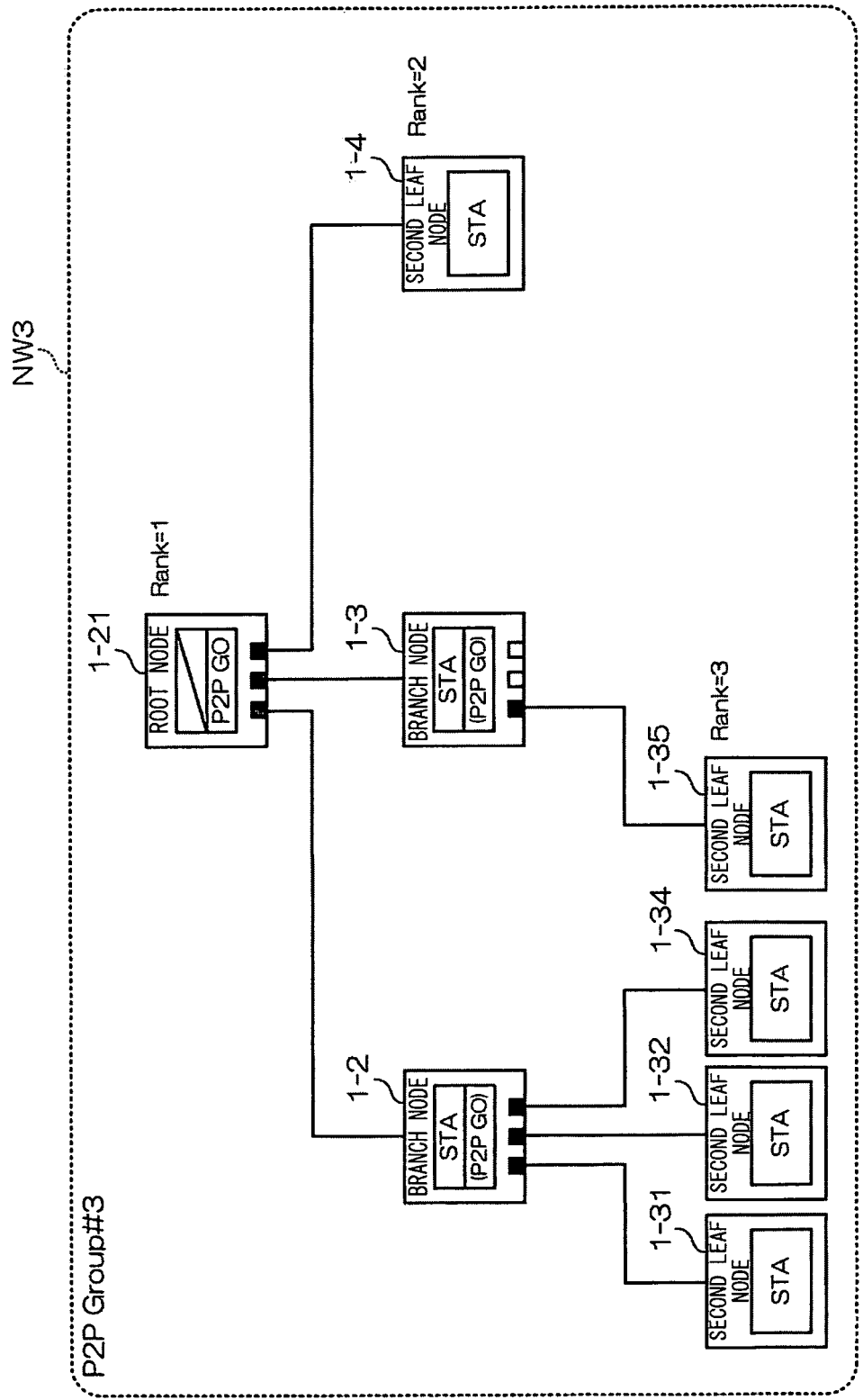
FIG. 16 is a conceptual diagram illustrating another example of rebuilding P2P networks when the P2P networks encounter each other according to the present embodiment.

FIGS. 14 to 16 are conceptual diagrams illustrating another example of rebuilding P2P networks when the P2P networks encounter each other in the present embodiment.

First, as shown in FIG. 14, it is assumed that two P2P networks NW3 and NW4 encounter each other. In the P2P network NW3, a branch node 1-2, a second leaf node 1-3, and a second leaf node 1-4 are connected to a root node 1-1.

On the other hand, in the P2P network NW4, a branch node 1-32 and a second leaf node 1-34 are connected to a root node 1-31. Further, a second leaf node 1-35 is connected to the branch node 1-32.

Accordingly, in the example shown in FIG. 14, the number of nodes of the P2P network NW3 is "4" including the root node 1-1, and the number of nodes of the P2P network NW4 is "4" including the root node 1-31. On the other hand, the number of ranks of the P2P network NW3 is "2", and the number of ranks of the P2P network NW4 is "3". Thus, according to the above-mentioned connection determination condition shown in FIG. 3B and the flowchart shown in FIG. 10, in the P2P network NW4 having a large number of ranks, the host P2P network is broken. Accordingly, the P2P network NW4 terminates connection of all the nodes to become non-associated nodes 1-31, 1-32, 1-34, and 1-35, as shown in FIG. 15. The P2P network NW3 is not broken and maintains the state as it is.

Next, the non-associated nodes 1-31, 1-32, 1-34, and 1-35 are connected to the P2P network NW3 as shown in FIG. 16, according to the above-mentioned flowchart shown in FIG. 5. First, as shown in FIG. 16, the non-associated nodes 1-31, 1-32 and 1-34 are connected to the branch node 1-2 that is a connection-accepting node (empty state) in the P2P network NW3, and then, transition to the second leaf nodes 1-31, 1-32, and 1-34.

Then, the second leaf node 1-3 shown in FIG. 15 transitions to the branch node 1-3 to become a connection-accepting node (empty state). Further, as shown in FIG. 16, the non-associated node 1-35 is connected to the branch node 1-3, and then, transitions to the second leaf node 1-35. As described above, the rebuilding when the P2P networks NW3 and NW4 encounter each other is terminated.

Figure 17A:
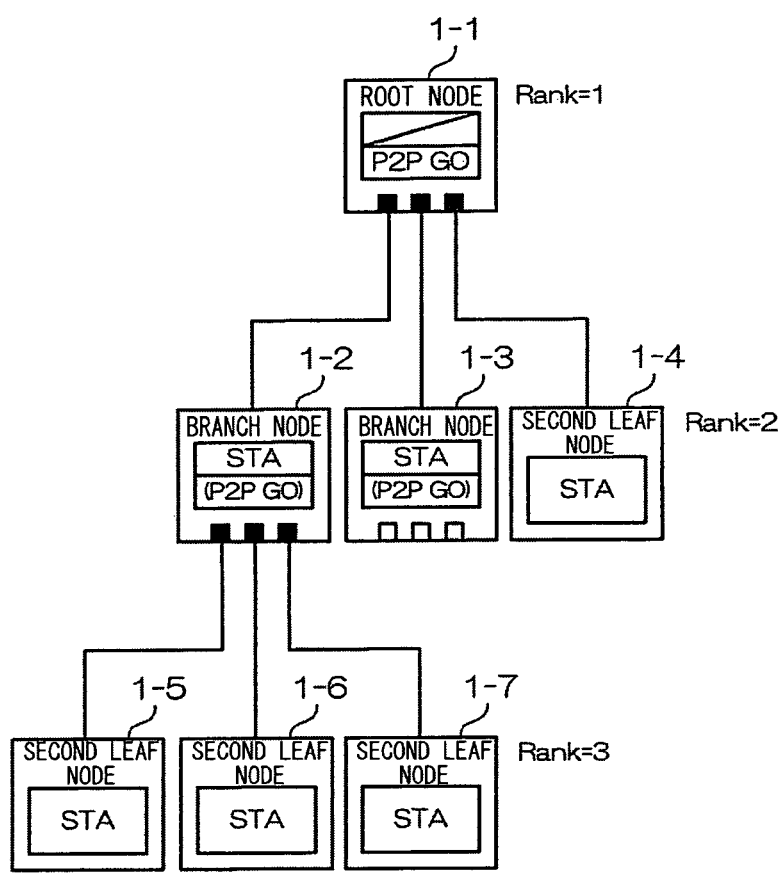
FIG. 17A is a conceptual diagram illustrating a modification example of a rebuilding example of a P2P network according to the present embodiment.
Figure 17B:
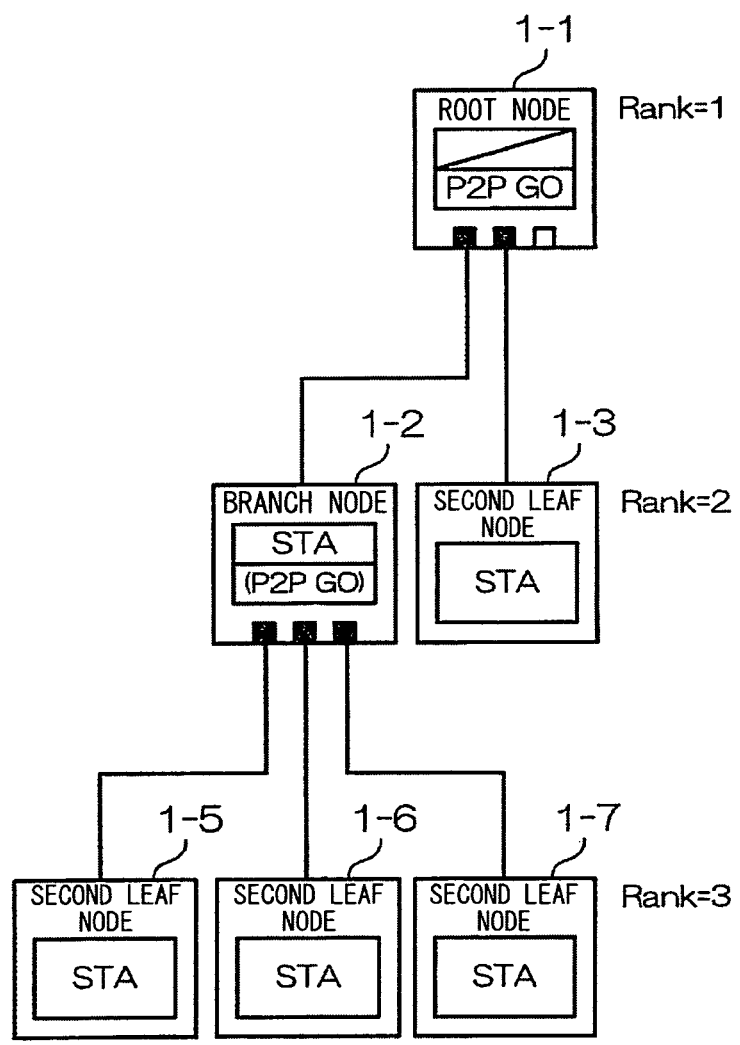
FIG. 17B is a conceptual diagram illustrating a modification example of a rebuilding example of a P2P network according to the present embodiment.

FIGS. 17A and 17B are conceptual diagrams illustrating a modification example of a rebuilding example of a P2P network, in the present embodiment. FIGS. 17A and 17B show rebuilding of a network when a portable electronic device (node) that forms the P2P network is separated.

As shown in FIG. 17A, in the P2P network, a branch node 1-2, a branch node 1-3, and a second leaf node 1-4 are connected to a root node 1-1. Further, second leaf nodes 1-5, 1-6, and 1-7 are connected to the branch node 1-2. In this state, as shown in FIG. 17B, when a portable electronic device that functions as the second leaf node (or branch node) of the same rank as that of the branch node 1-2 is separated from the P2P network, the P2P network is not rebuilt.

That is, in the state shown in FIG. 17B, if any one of the second leaf nodes 1-5, 1-6, and 1-7 in the rank of Rank=3 is cut once and is then connected again to the root node 1-1, since the number of nodes of the deep rank becomes small in view of the hierarchy, the burden on the P2P network is reduced. However, the effect is small compared with the burden due to the rebuilding.

Accordingly, in this way, when another portable electronic device that functions as the non-associated node 1*a* is connected and the host device functions as the branch node 1*e*, and when another portable electronic device 1 that functions as a leaf node or a branch node of the same rank as that of the host device is separated from the P2P network, the P2P network may not be rebuilt.

Figure 18A:
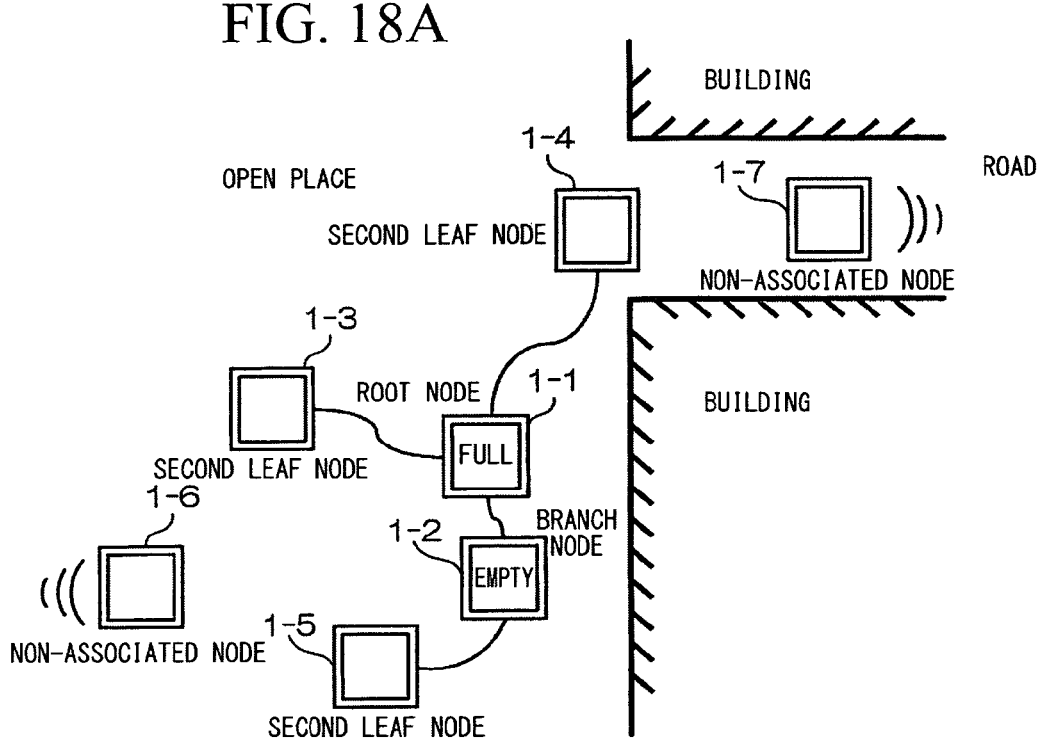
FIG. 18A is a conceptual diagram illustrating another modification example of a rebuilding example of a P2P network in the present embodiment.
Figure 18B:
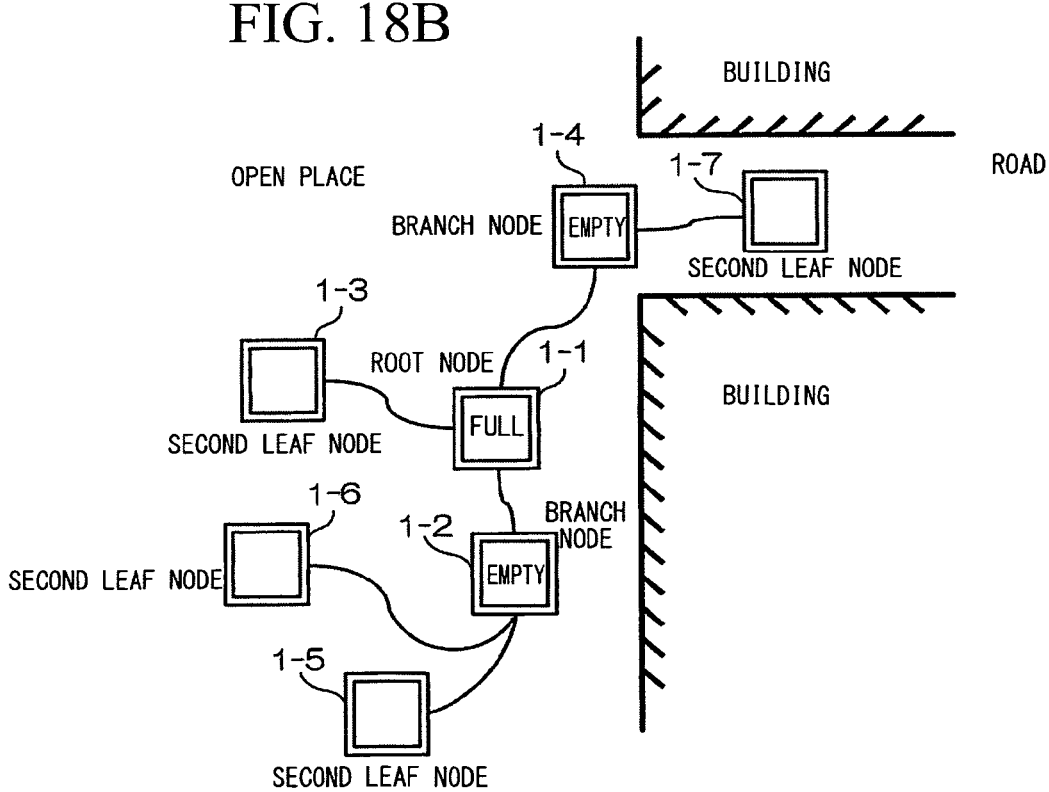
FIG. 18B is a conceptual diagram illustrating still another modification example of a rebuilding example of a P2P network in the present embodiment.

FIGS. 18A and 18B are conceptual diagrams illustrating a modification example of a rebuilding example of a P2P network, in the present embodiment. According to a positional relationship between a P2P network and an non-associated node 1*a* to be newly added to the P2P network or a peripheral environment (arrangement of a building), even though the non-associated node 1*a* sufficiently approaches the P2P network, the non-associated node 1*a* may not be connected to the connection-accepting (empty) branch node 1*e* or the like.

FIG. 18A shows a case where an non-associated node 1-6 approaches a P2P network present in an open place from the open place, and an non-associated node 1-7 approaches the P2P network in the open place from a road between buildings. In the P2P network, a branch node 1-2 (empty), and second leaf nodes 1-3 and 1-4 are connected to a root node 1-1 (full). Further, a second leaf node 1-5 is connected to the branch node 1-2.

Accordingly, the non-associated nodes 1-6 and 1-7 are only connectable to the branch node 1-2.

Since the non-associated node 1-6 comes near from the open place, the non-associated node 1-6 can find the connectable (empty) branch node 1-2. Thus, as shown in FIG. 18B, the non-associated node 1-6 is connected to the branch node 1-2, and then, transitions to the second leaf node 1-6.

On the other hand, the non-associated node 1-7 comes near from the road between the buildings. For this reason, the non-associated node 1-7 cannot find the connectable (empty) branch node 1-2. Thus, even though the non-associated node 1-7 sufficiently approaches the P2P network, connection may not be performed.

Accordingly, in the present embodiment, when the portable electronic device 1 (second leaf node 1-4 in the shown example) that functions as a leaf node detects the approach of another portable electronic device 1 that functions as the non-associated node 1-7 by the approach-detecting section 38, the portable electronic device 1 transitions to the branch node 1-4 to be switched to a connection-accepting node (empty state). Thus, as shown in FIG. 18B, the non-associated node 1-7 can be connected to the branch node 1-4. After connection to the branch node 1-4, the non-associated node 1-7 transitions to the second leaf node 1-7.

Figure 19:
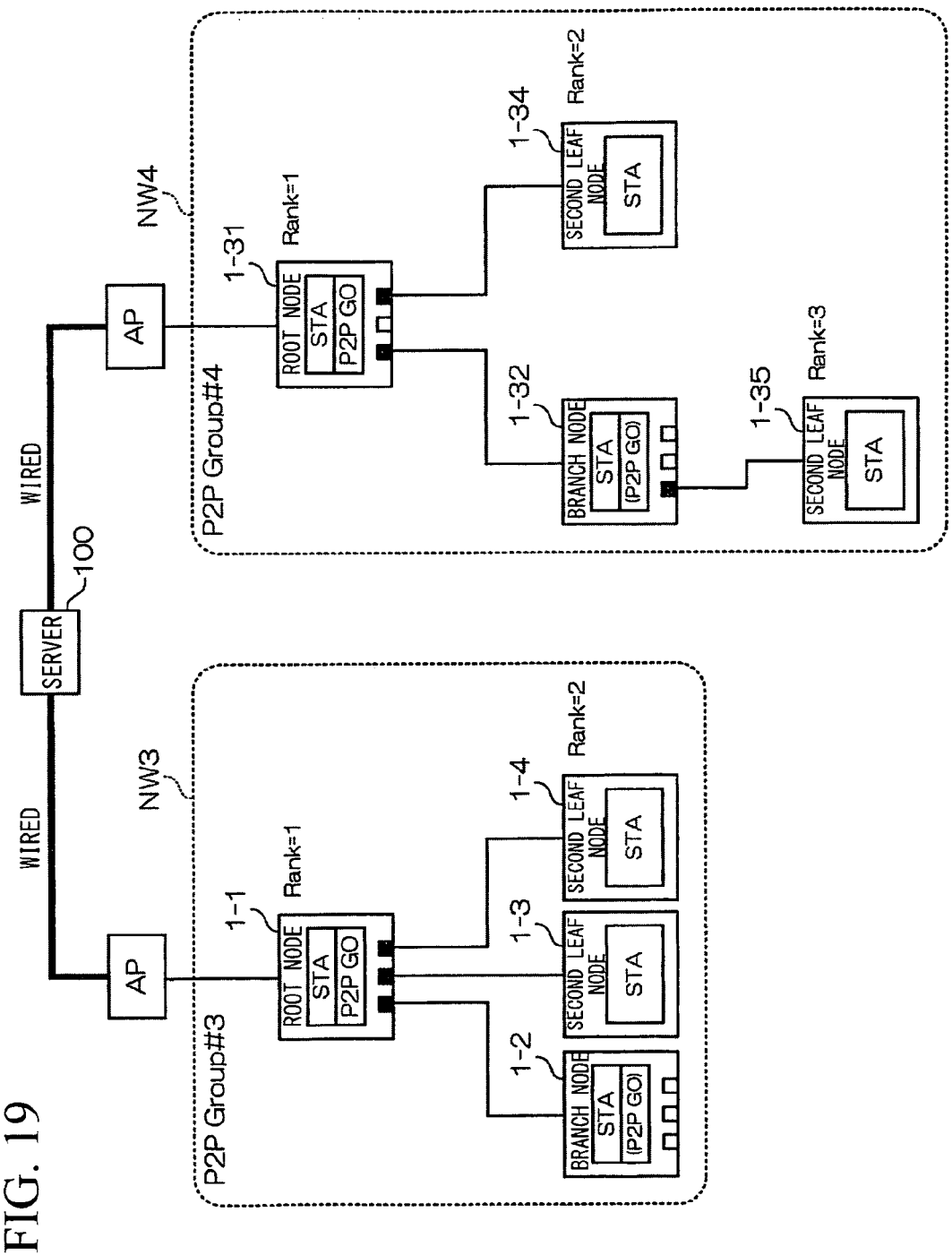
FIG. 19 is a conceptual diagram illustrating another modification example when P2P networks encounter each other according to the present embodiment.

FIG. 19 is a conceptual diagram illustrating another modification example when P2P networks encounter each other in the present embodiment. Here, similar to FIG. 14, as shown in FIG. 19, it is assumed that two P2P networks NW3 and NW4 encounter each other. In the P2P network NW3, a branch node 1-2, a second leaf node 1-3, and a second leaf node 1-4 are connected to a root node 1-1. On the other hand, in the P2P network NW4, a branch node 1-32 and a second leaf node 1-34 are connected to a root node 1-31. Further, a second leaf node 1-35 is connected to the branch node 1-32.

In the example shown in FIG. 14, connection of the nodes in the P2P network NW4 is terminated for rebuilding. However, as shown in FIG. 19, since the root nodes 1-1 and 1-31 are connected to an access point AP using a concurrent operation and are connected to a server 100 through the access point AP, the root nodes 1-1 and 1-31 in the P2P networks NW3 and NW4 may be connected to each other through wired connection. The concurrent operation is performed to operate the first protocol and the second protocol at the same time. In this case, it is not necessary to terminate the connection of the nodes for rebuilding.

In the above-described embodiment, when the P2P networks encounter each other, the connection control section 32 of the portable electronic device 1 that functions as the root node 1*b* of each P2P network may determine whether to terminate connection of another portable electronic device 1 in the host P2P network based on the connection determination condition shown in FIG. 3B. However, as another connection determination condition, for example, when the residual battery capacity of the root node 1*b* in the host P2P network is smaller than the residual battery capacity of the root node 1*b* in the other P2P network, the connection control section 32 may perform a control for terminating connection of another portable electronic device in the host P2P network.

Further, as another predetermined connection determination condition, when a battery shortage time based on the residual battery capacity of the root node 1*b* in the host P2P network and a decreasing speed of the battery is shorter than a battery shortage time based on the residual battery capacity of the root node 1*b* in the other P2P network and a decreasing speed of the battery, the connection control section 32 may perform a control for terminating the connection in the P2P network.

Next, as another predetermined connection determination condition, when a receiving signal strength of the root node 1*b* in the host P2P network is weaker than a receiving signal strength of the root node 1*b* in the other P2P network, the connection control section 32 may perform a control for terminating the connection in the P2P network.

Further, as another predetermined connection determination condition, when a version of software stored in the root node 1*b* in the host P2P network is older than a version of software stored in the root node 1*b* in the other P2P network, the connection control section 32 may perform a control for terminating the connection in the P2P network.

Further, as another predetermined connection determination condition, the connection control section 32 may perform a control for terminating the connection of another portable electronic device in the host P2P network according to a comparison result of a unique value given to the host P2P network and a unique value given to the other P2P network.

Further, the connection control section 32 may determine a predetermined connection determination condition based on negotiation with the root node in the other P2P network.

In addition, a computer of the portable electronic device 1 may be provided with a program for executing a transition control process of controlling the transition and a topology process of controlling the topology of the P2P network. The topology process may include a process of controlling, when the portable electronic device is functioning as the root node, acceptance or rejection of another portable electronic device, which is functioning as the non-associated node, for connecting with each node under control of the portable electronic device, and a process controlling, when the portable electronic device is functioning as the branch node or the leaf node, acceptance or rejection of the another portable electronic device, which is functioning as the non-associated node, for connecting with the portable electronic device in accordance with a control of a root node.

Further, a computer of the portable electronic device 1 may be provided with a program for executing a transition control process of controlling the transition, a search process of searching the another portable electronic device that is connectable, and a connection control process of controlling connection with the another portable electronic device found by the search process. The connection control process may include a process of performing, when the portable electronic device is functioning as the non-associated node, a control for connecting the portable electronic device with the another portable electronic device when the another portable electronic device functioning as a root node or a branch node in another P2P network is found, and a process of performing, when the portable electronic device is functioning as the root node in a certain P2P network, a control for terminating connection of the another portable electronic device in the P2P network according to a predetermined connection determination condition when the another portable electronic device functioning as the root node in another P2P network is found.

Further, a computer of the portable electronic device 1 may be provided with a program for executing a transition control process of controlling the transition, a search process of searching the another portable electronic device that is connectable, and a connection control process of controlling connection with the another portable electronic device found by the search section. The connection control process may include, when the portable electronic device is functioning as the non-associated node, and when another portable electronic device functioning as an non-associated node is found, a process of performing a control for connecting the portable electronic device with the another electronic device as a first connection control, a process of performing a control for terminating the connection with the another portable electronic device connected by the first connection control as a second connection control, and a process of performing a control for re-connecting the portable electronic device with the another portable electronic device in which the connection is terminated by the second connection control as a third connection control.

In the present embodiment, a portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device includes a topology control section configured to control a topology of the P2P network, wherein, when the portable electronic device is functioning as the root node, the topology control section controls acceptance or rejection of the another portable electronic device, which is functioning as the non-associated node, for connecting with each node under control of the portable electronic device, and wherein, when the portable electronic device is functioning as the branch node or the leaf node, the topology control section controls acceptance or rejection of the another portable electronic device, which is functioning as the non-associated node, for connecting with the portable electronic device in accordance with a control of a root node.

In the portable electronic device, when the portable electronic device is functioning as the root node and when before a number of child nodes directly under the portable electronic device reaches a predetermined number, the topology control section may perform a control for accepting connection of the another portable electronic device, which is functioning as the non-associated node, with the portable electronic device, and may perform a control for rejecting connection of the another portable electronic device, which is functioning as the non-associated node, with each node under control of the portable electronic device.

In the portable electronic device, when the portable electronic device is functioning as the root node and when after the number of the child nodes directly under the portable electronic device reaches the predetermined number, the topology control section may perform a control for rejecting connection of the another portable electronic device, which is functioning as the non-associated node, with the portable electronic device, and may perform a control for accepting connection of the another portable electronic device, which is functioning as the non-associated node, with each node under control of the portable electronic device.

In the portable electronic device, when the portable electronic device is functioning as the branch node while being connected with the another portable electronic device which was functioning as the non-associated node, the topology control section does not rebuild topology when the another portable electronic device that is functioning as a leaf node or a branch node having a same rank with the portable electronic device is separated from the P2P network.

In the portable electronic device, when the portable electronic device is functioning as the root node, the topology control section may perform a control for accepting connection of the another portable electronic device, which is functioning as the non-associated node, with the portable electronic device that is functioning as the root node or with another certain portable electronic device that is functioning as a branch node or a leaf node under control of the portable electronic device.

The portable electronic device may further include an approach-detecting section configured to detect approach of the portable electronic device that is functioning as the non-associated node when the portable electronic device is functioning as the branch node or the leaf node.

The portable electronic device may further include a connection control section configured to control wired connection with the root node in another P2P network through wired connection when the portable electronic device is functioning as the root node.

The portable electronic device further includes a search section configured to search the another portable electronic device that is connectable, wherein, when the portable electronic device is functioning as the leaf node where connection is accepted with the another portable electronic device that is functioning as the non-associated node, the search section may search the another portable electronic device at a small frequency compared to a case where the portable electronic device is functioning as the root node.

In the present embodiment, a portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device includes a transition control section configured to control the transition, a search section configured to search the another portable electronic device that is connectable, and a connection control section configured to control connection with the another portable electronic device found by the search section, wherein, when the portable electronic device is functioning as the non-associated node, the connection control section performs a control for connecting the portable electronic device with the another portable electronic device when the another portable electronic device functioning as a root node or a branch node in a P2P network is found, and wherein, when the portable electronic device is functioning as the root node in a certain P2P network, the connection control section performs a control for terminating connection of the another portable electronic device in the P2P network according to a predetermined connection determination condition when the another portable electronic device functioning as a root node in another P2P network is found.

In the present embodiment, the portable electronic device may further include a transition control section configured to control the transition, a search section configured to search the another portable electronic device that is connectable, and a connection control section configured to control connection with the another portable electronic device found by the search section, wherein, when the portable electronic device is functioning as the non-associated node, the connection control section may perform a control for connecting the portable electronic device with the another portable electronic device when the another portable electronic device functioning as a root node or a branch node in a P2P network is found, and wherein, when the portable electronic device is functioning as the root node in a certain P2P network, the connection control section may perform a control for terminating connection of the another portable electronic device in the certain P2P network according to a predetermined connection determination condition when the another portable electronic device functioning as a root node in another P2P network is found.

In the present embodiment, as for the predetermined connection determination condition, when a number of ranks of a P2P network to which the portable electronic device belongs is greater than a number of ranks of the another P2P network, the connection control section may perform a control for terminating connection of the another portable electronic device in the P2P network.

In the present embodiment, as for the predetermined connection determination condition, when a number of nodes under control of the portable electronic device is smaller than a number of nodes under control of the root node in the another P2P network, the connection control section may perform a control for terminating connection of the another portable electronic device in the P2P network.

In the present embodiment, as for the predetermined connection determination condition, when a residual battery capacity of the portable electronic device is smaller than a residual battery capacity of the root node in the P2P network, the connection control section may perform a control for terminating connection of the another portable electronic device in the P2P network.

In the present embodiment, as for the predetermined connection determination condition, when a time until a battery comes short based on a residual battery capacity and a decreasing speed of the battery capacity of the portable electronic device is shorter than a time until a battery comes short based on a residual battery capacity and a decreasing speed of the battery capacity of the root node in the other P2P network, the connection control section may perform a control for terminating connection of the another portable electronic device in the P2P network.

In the present embodiment, as for the predetermined connection determination condition, when a receiving signal strength of the portable electronic device is weaker than a receiving signal strength of the root node in the P2P network, the connection control section may perform a control for terminating connection of the another portable electronic device in the P2P network.

In the present embodiment, as for the predetermined connection determination condition, when a version of software stored in the portable electronic device is older than a version of software stored in the root node in the another P2P network, the connection control section may perform a control for terminating connection of the another portable electronic device in the P2P network.

In the present embodiment, as for the predetermined connection determination condition, the connection control section may perform a control for terminating connection of the another portable electronic device in a P2P network, according to a comparison result of a unique value given to the P2P network to which the portable electronic device belongs and a unique value given to the another P2P network.

In the present embodiment, the connection control section may determine the predetermined connection determination condition based on negotiation with the root node in the P2P network.

In the present embodiment, when the portable electronic device was functioning as the root node in the P2P network before connection termination from the P2P network, the transition control section may transition the portable electronic device to the non-associated node from the root node; wherein, when the portable electronic device was functioning as the branch node in the P2P network before connection termination from the P2P network, the transition control section may transition the portable electronic device to the non-associated node from the branch node; and when the portable electronic device was functioning as the leaf node in the P2P network before connection termination from the P2P network, the transition control section may transition the portable electronic device to the non-associated node from the leaf node.

In the present embodiment, a portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device includes a transition control section configured to control the transition, a search section configured to search the another portable electronic device that is connectable, and a connection control section configured to control connection with the another portable electronic device found by the search section, wherein, when the portable electronic device is functioning as the non-associated node and when another portable electronic device functioning as the non-associated node is found, the connection control section performs a control for connecting the portable electronic device with the another electronic device as a first connection control, performs a control for terminating the connection with the another portable electronic device connected by the first connection control as a second connection control, and performs a control for re-connecting the portable electronic device with the another portable electronic device in which the connection is terminated by the second connection control as a third connection control.

In the present embodiment, when the portable electronic device is functioning as the non-associated node and when the another portable electronic device functioning as the non-associated node is found, the connection control section may perform a control for connecting the portable electronic device with the another portable electronic device as a first connection control, may perform a control for terminating the connection with the another portable electronic device connected by the first connection control as a second connection control, and may perform a control for re-connecting the portable electronic device with the another portable electronic device in which the connection is terminated by the second connection control as a third connection control.

In the present embodiment, the connection control section may execute the second connection control and the third connection control immediately after executing the first connection control.

In the present embodiment, the connection control section may execute the second connection control and the third connection control based on communication traffic with respect to the connected another portable electronic device after executing the first connection control.

In the present embodiment, the transition control section may transition the portable electronic device to the root node or the leaf node from the non-associated node after the first connection control is executed by the connection control section, and, when the portable electronic device is functioning as the leaf node after execution of the first connection control, the connection control section may execute the second connection control and the third connection control when connection of a child node is necessary directly under the portable electronic device that is functioning as the leaf node.

In the present embodiment, the connection control section may execute the first connection control according to a first protocol, and may execute the third connection control according to a second protocol.

In the leaf node may include a first leaf node that is not capable to transition to a branch node and a second leaf node that is capable to transition to a branch node according to a connection status and a control, wherein the transition control section may transition the portable electronic device to the root node or the first leaf node from the non-associated node after the first connection control is executed by the connection control section; wherein, when the portable electronic device is functioning as the root node after execution of the first connection control, the transition control section may maintain the state of the root node after the second connection control is executed by the connection control section; wherein, when the portable electronic device is functioning as the first leaf node after execution of the first connection control, the transition control section may transition the portable electronic device to the non-associated node from the first leaf node after the second connection control is executed by the connection control section; wherein, when the portable electronic device is functioning as the root node after execution of the second connection control, the transition control section may maintain the state of the root node of the portable electronic device after the third connection control is executed by the connection control section, and when the portable electronic device is functioning as the non-associated node after execution of the second connection control, the transition control section may transition the portable electronic device from the non-associated node to the second leaf node after the third connection control is executed by the connection control section.

In the present embodiment, the search section may search for, when the portable electronic device functions as the non-associated node, the root node or the branch node that is connectable, and may search for, when no node is found, the non-associated node that is connectable.

What is claimed is:

1. A portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device comprising:

a topology control section configured to control a topology of the P2P network, wherein, when the portable electronic device is functioning as the root node, the topology control section controls acceptance or rejection of the another portable electronic device, which is functioning as the non-associated node, for connecting with each node under control of the portable electronic device, and wherein, when the portable electronic device is functioning as the branch node or the leaf node, the topology control section controls acceptance or rejection of the another portable electronic device, which is functioning as the non-associated node, for connecting with the portable electronic device in accordance with a control of the root node.

2. The portable electronic device according to claim 1, wherein, when the portable electronic device is functioning as the root node and when before a number of child nodes directly under the portable electronic device reaches a predetermined number, the topology control section performs a control for accepting connection of the another portable electronic device, which is functioning as the non-associated node, with the portable electronic device, and performs a control for rejecting connection of the another portable electronic device, which is functioning as the non-associated node, with each node under control of the portable electronic device.

3. The portable electronic device according to claim 2, wherein, when the portable electronic device is functioning as the root node and when after the number of the child nodes directly under the portable electronic device reaches the predetermined number, the topology control section
performs a control for rejecting connection of the another portable electronic device, which is functioning as the non-associated node, with the portable electronic device, and
performs a control for accepting connection of the another portable electronic device, which is functioning as the non-associated node, with each node under control of the portable electronic device.

4. The portable electronic device according to claim 1, wherein, when the portable electronic device is functioning as the branch node while being connected with the another portable electronic device which was functioning as the non-associated node, the topology control section does not rebuild topology when the another portable electronic device that is functioning as the leaf node or the branch node having a same rank with the portable electronic device is separated from the P2P network.

5. The portable electronic device according to claim 1, wherein, when the portable electronic device is functioning as the root node, the topology control section performs a control for accepting connection of the another portable electronic device, which is functioning as the non-associated node, with the portable electronic device that is functioning as the root node or with another certain portable electronic device that is functioning as the branch node or the leaf node under control of the portable electronic device.

6. The portable electronic device according to claim 1, further comprising:
an approach-detecting section configured to detect approach of the another portable electronic device that is functioning as the non-associated node when the portable electronic device is functioning as the branch node or the leaf node.

7. The portable electronic device according to claim 1, further comprising:
a connection control section configured to control wired connection with the root node in another P2P network through wired connection when the portable electronic device is functioning as the root node.

8. The portable electronic device according to claim 1, further comprising:
a search section configured to search the another portable electronic device that is connectable,
wherein, when the portable electronic device is functioning as the leaf node where connection is accepted with the another portable electronic device that is functioning as the non-associated node, the search section searches the another portable electronic device at a small frequency compared to a case where the portable electronic device is functioning as the root node.

9. A portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device comprising:
a transition control section configured to control the transition;
a search section configured to search the another portable electronic device that is connectable; and
a connection control section configured to control connection with the another portable electronic device found by the search section,
wherein, when the portable electronic device is functioning as the non-associated node, the connection control section performs a control for connecting the portable electronic device with the another portable electronic device when the another portable electronic device functioning as the root node or the branch node in a P2P network is found, and
wherein, when the portable electronic device is functioning as the root node in a certain P2P network, the connection control section performs a control for terminating connection of the another portable electronic device in the P2P network according to a predetermined connection determination condition when the another portable electronic device functioning as the root node in another P2P network is found.

10. The portable electronic device according to claim 1, further comprising:
a transition control section configured to control the transition;
a search section configured to search the another portable electronic device that is connectable; and
a connection control section configured to control connection with the another portable electronic device found by the search section,
wherein, when the portable electronic device is functioning as the non-associated node, the connection control section performs a control for connecting the portable electronic device with the another portable electronic device when the another portable electronic device functioning as the root node or the branch node in a P2P network is found, and
wherein, when the portable electronic device is functioning as the root node in a certain P2P network, the connection control section performs a control for terminating connection of the another portable electronic device in the P2P network according to a predetermined connection determination condition when the another portable electronic device functioning as the root node in another P2P network is found.

11. The portable electronic device according to claim 9, wherein, as for the predetermined connection determination condition, when a number of ranks of a P2P network to which the portable electronic device belongs is greater than a number of ranks of the another P2P network, the connection control section performs a control for terminating connection of the another portable electronic device in the P2P network.

12. The portable electronic device according to claim 9, wherein, as for the predetermined connection determination condition, when a number of nodes under control of the portable electronic device is smaller than a number of nodes under control of the root node in the another P2P network, the connection control section performs a control for terminating connection of the another portable electronic device in the P2P network.

13. The portable electronic device according to claim 9, wherein, as for the predetermined connection determination condition, when a residual battery capacity of the portable electronic device is smaller than a residual battery capacity of the root node in the another P2P network, the connection control section performs a control for terminating connection of the another portable electronic device in the P2P network.

14. The portable electronic device according to claim 9, wherein, as for the predetermined connection determination condition, when a time until a battery comes short based on a residual battery capacity and a decreasing speed of the battery capacity of the portable electronic device is shorter than a time until a battery comes short based on a residual battery capacity and a decreasing speed of the battery capacity of the root node in the other P2P network, the connection control section performs a control for terminating connection of the another portable electronic device in the P2P network.

15. The portable electronic device according to claim 9, wherein, as for the predetermined connection determination condition, when a receiving signal strength of the portable electronic device is weaker than a receiving signal strength of the root node in the another P2P network, the connection control section performs a control for terminating connection of the another portable electronic device in the P2P network.

16. The portable electronic device according to claim 9, wherein, as for the predetermined connection determination condition, when a version of software stored in the portable electronic device is older than a version of software stored in the root node in the another P2P network, the connection control section performs a control for terminating connection of the another portable electronic device in the P2P network.

17. The portable electronic device according to claim 9, wherein, as for the predetermined connection determination condition, the connection control section performs a control for terminating connection of the another portable electronic device in a P2P network, according to a comparison result of a unique value given to the P2P network to which the portable electronic device belongs and a unique value given to the another P2P network.

18. The portable electronic device according to claim 9, wherein the connection control section determines the predetermined connection determination condition based on negotiation with the root node in the another P2P network.

19. The portable electronic device according to claim 9, wherein, when the portable electronic device was functioning as the root node in the P2P network before connection termination from the P2P network, the transition control section transitions the portable electronic device to the non-associated node from the root node,
wherein, when the portable electronic device was functioning as the branch node in the P2P network before connection termination from the P2P network, the transition control section transitions the portable electronic device to the non-associated node from the branch node, and
wherein, when the portable electronic device was functioning as the leaf node in the P2P network before connection termination from the P2P network, the transition control section transitions the portable electronic device to the non-associated node from the leaf node.

20. A portable electronic device that transitions to each state of a root node, a branch node or a leaf node in a P2P network of a cluster structure, or an non-associated node that does not belong to the P2P network, in order to perform a function of the transitioned node according to a status of wireless connection with another portable electronic device, the portable electronic device comprising:
a transition control section configured to control the transition;
a search section configured to search the another portable electronic device that is connectable; and
a connection control section configured to control connection with the another portable electronic device found by the search section,
wherein, when the portable electronic device is functioning as the non-associated node and when the another portable electronic device functioning as the non-associated node is found, the connection control section
performs a control for connecting the portable electronic device with the another electronic device as a first connection control,
performs a control for terminating the connection with the another portable electronic device connected by the first connection control as a second connection control, and
performs a control for re-connecting the portable electronic device with the another portable electronic device in which the connection is terminated by the second connection control as a third connection control.

21. The portable electronic device according to claim 9, wherein, when the portable electronic device is functioning as the non-associated node and when the another portable electronic device functioning as the non-associated node is found, the connection control section
performs a control for connecting the portable electronic device with the another portable electronic device as a first connection control,
performs a control for terminating the connection with the another portable electronic device connected by the first connection control as a second connection control, and
performs a control for re-connecting the portable electronic device with the another portable electronic device in which the connection is terminated by the second connection control as a third connection control.

22. The portable electronic device according to claim 20, wherein the connection control section executes the second connection control and the third connection control immediately after executing the first connection control.

23. The portable electronic device according to claim 20, wherein the connection control section executes the second connection control and the third connection control based on communication traffic with respect to the connected another portable electronic device after executing the first connection control.

24. The portable electronic device according to claim 20, wherein the transition control section transitions the portable electronic device to the root node or the leaf node from the non-associated node after the first connection control is executed by the connection control section, and
wherein, when the portable electronic device is functioning as the leaf node after execution of the first connection control, the connection control section executes the second connection control and the third connection control when connection of a child node is necessary directly under the portable electronic device that is functioning as the leaf node.

25. The portable electronic device according to claim 20, wherein the connection control section executes the first connection control according to a first protocol, and executes the third connection control according to a second protocol.

26. The portable electronic device according to claim 20, wherein the leaf node includes a first leaf node that is not capable to transition to the branch node and a second leaf node that is capable to transition to the branch node, according to a connection status and a control, wherein the transition control section transitions the portable electronic device to the root node or the first leaf node from the non-associated node after the first connection control is executed by the connection control section, wherein, when the portable electronic device is functioning as the root node after execution of the first connection control, the transition control section maintains the state of the root node after the second connection control is executed by the connection control section, wherein, when the portable electronic device is functioning as the first leaf node after execution of the first connection control, the transition control section transitions the portable electronic device to the non-associated node from the first leaf node after the second connection control is executed by the connection control section, wherein, when the portable electronic device is functioning as the root node after execution of the second connection control, the transition control section maintains the state of the root node of the portable electronic device after the third connection control is executed by the connection control section, and wherein, when the portable electronic device is functioning as the non-associated node after execution of the second connection control, the transition control section transitions the portable electronic device from the non-associated node to the second leaf node after the third connection control is executed by the connection control section.

27. The portable electronic device according to claim 20, wherein, when the portable electronic device is functioning as the non-associated node, the search section searches the root node or the branch node that is connectable, and searches the non-associated node that is connectable when the root node or the branch node was not found.

28. A non-transitory computer readable storage medium that stores programs for executing a procedure in a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device, the procedure comprising:

controlling the transition; and
controlling a topology of the P2P network,
wherein the controlling the topology includes
controlling, when the portable electronic device is functioning as the root node, acceptance or rejection of the another portable electronic device, which is functioning as the non-associated node, for connecting with each node under control of the portable electronic device, and controlling, when the portable electronic device is functioning as the branch node or the leaf node, acceptance or rejection of the another portable electronic device, which is functioning as the non-associated node, for connecting with the portable electronic device in accordance with a control of the root node.

29. A non-transitory computer readable storage medium that stores programs for executing a procedure in a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device, the procedure comprising:

controlling the transition;
searching the another portable electronic device that is connectable; and
controlling connection with the another portable electronic device found by the searching,
wherein the controlling the connection includes
performing, when the portable electronic device is functioning as the non-associated node, a control for connecting the portable electronic device with the another portable electronic device when the another portable electronic device functioning as the root node or the branch node in another P2P network is found, and performing, when the portable electronic device is functioning as the root node in a certain P2P network, a control for terminating connection of the another portable electronic device in the P2P network according to a predetermined connection determination condition when the another portable electronic device functioning as the root node in another P2P network is found.

30. A non-transitory computer readable storage medium that stores programs for executing a procedure in a computer of a portable electronic device which transitions to each state of a root node, a branch node or a leaf node in a P2P network of a cluster structure, or an non-associated node which does not belong to the P2P network, in order to perform a function of the transitioned node according to a status of wireless connection with another portable electronic device, the procedure comprising:

controlling the transition;
searching the another portable electronic device that is connectable; and
controlling connection with the another portable electronic device found by the search section,
wherein the controlling the connection includes, when the portable electronic device is functioning as the non-associated node and when the another portable electronic device functioning as an non-associated node is found, performing a control for connecting the portable electronic device with the another electronic device as a first connection control, performing a control for terminating the connection with the another portable electronic device connected by the first connection control as a second connection control, and performing a control for re-connecting the portable electronic device with the another portable electronic device in which the connection is terminated by the second connection control as a third connection control.

* * * * *